(12) United States Patent
Hanczor et al.

(10) Patent No.: US 11,767,042 B2
(45) Date of Patent: Sep. 26, 2023

(54) ENHANCED TRANSIT LOCATION SYSTEMS AND METHODS

(71) Applicant: Piper Networks, Inc., San Diego, CA (US)

(72) Inventors: Robert Hanczor, San Diego, CA (US); Duane Maxwell, San Diego, CA (US)

(73) Assignee: Piper Networks, Inc., San Diego, CA (US)

( * ) Notice: Subject to any disclaimer, the term of this patent is extended or adjusted under 35 U.S.C. 154(b) by 479 days.

(21) Appl. No.: 17/014,974

(22) Filed: Sep. 8, 2020

(65) Prior Publication Data

US 2021/0070332 A1    Mar. 11, 2021

Related U.S. Application Data

(60) Provisional application No. 62/897,860, filed on Sep. 9, 2019.

(51) Int. Cl.
| | |
|---|---|
| *B61L 27/04* | (2006.01) |
| *B61L 25/02* | (2006.01) |
| *H04W 4/021* | (2018.01) |
| *B61L 23/06* | (2006.01) |
| *B61L 15/00* | (2006.01) |
| *H04W 88/04* | (2009.01) |
| *H04W 76/15* | (2018.01) |
| *H04W 84/18* | (2009.01) |

(52) U.S. Cl.
CPC ......... *B61L 25/025* (2013.01); *B61L 15/0027* (2013.01); *B61L 23/06* (2013.01); *B61L 27/04* (2013.01); *H04W 4/021* (2013.01); *B61L 2201/00* (2013.01); *B61L 2205/00* (2013.01); *H04W 76/15* (2018.02); *H04W 84/18* (2013.01); *H04W 88/04* (2013.01)

(58) Field of Classification Search
CPC .... B61L 25/025; B61L 15/0027; B61L 23/06; B61L 27/04; B61L 2201/00; B61L 2205/00; H04W 4/021; H04W 76/15; H04W 84/18; H04W 88/04
See application file for complete search history.

(56) References Cited

U.S. PATENT DOCUMENTS

| | | | |
|---|---|---|---|
| 4,711,418 | A | 12/1987 | Aver, Jr. et al. |
| 5,420,883 | A | 5/1995 | Swensen et al. |
| 6,900,740 | B2 | 5/2005 | Bloomquist et al. |
| 8,655,372 | B2 † | 2/2014 | Riesco |
| 9,470,531 | B2 | 10/2016 | Moerman |

(Continued)

FOREIGN PATENT DOCUMENTS

WO    2018/108180 A1    6/2018

OTHER PUBLICATIONS

International Search Report and Written Opinion in PCT/US20/049767, dated Dec. 9, 2020.

(Continued)

*Primary Examiner* — Mathew Franklin Gordon

(57) ABSTRACT

Enhanced transit location systems and methods are provided. A method comprises receiving, into a vehicle radio located on a vehicle traveling along a roadway, signals transmitted by wayside radios located along the roadway; and determining a location of the vehicle along the roadway based on the received signals.

20 Claims, 21 Drawing Sheets
(20 of 21 Drawing Sheet(s) Filed in Color)

(56) References Cited

U.S. PATENT DOCUMENTS

| | | | |
|---|---|---|---|
| 2005/0174974 | A1 | 8/2005 | Sonnitag et al. |
| 2012/0283947 | A1 | 11/2012 | T'Siobbel |
| 2013/0127643 | A1 | 5/2013 | Malarky |
| 2014/0210595 | A1 | 7/2014 | Kanner et al. |
| 2015/0329130 | A1 | 11/2015 | Carlson et al. |
| 2016/0121912 | A1 | 5/2016 | Puttagunta et al. |
| 2016/0280240 | A1 | 9/2016 | Carlson et al. |
| 2018/0188380 | A1 | 7/2018 | Venkatraman et al. |
| 2019/0090117 | A1 | 3/2019 | Shirahatti et al. |
| 2019/0113631 | A1 | 4/2019 | Stroiescu et al. |
| 2019/0332120 | A1 † | 10/2019 | Choi |
| 2020/0070859 | A1 † | 3/2020 | Green |
| 2020/0189633 | A1 † | 6/2020 | Green |
| 2020/0309533 | A1 | 10/2020 | Young et al. |
| 2021/0354718 | A1 † | 11/2021 | Lu |

OTHER PUBLICATIONS

International Preliminary Report on Patentability in Intl. App. No. PCT/US2020/049767, dated Mar. 9, 2022.
International Search Report and Written Opinion in PCT/US2020/048839, dated Nov. 30, 2020.
"Electromagnetic compatibility and Radio spectrum Matters (ERM); Short Range Devices (SRD); UWB location tracking devicesin the railroad environment," ETSI Technical Report, ETSI TR 101 538 V1.1.1 (Oct. 2012).

† cited by third party

HG-A - high gain antenna
BPG - band-pass filter
C - circulator
L - limiter
GB - gain block

ENHANCED TRANSIT LOCATION SYSTEMS AND METHODS

CROSS REFERENCE TO RELATED APPLICATIONS

The present application claims priority to U.S. Provisional Patent Application No. 62/897,860, filed Sep. 9, 2019, entitled "ENHANCED TRANSIT LOCATION SYSTEMS AND METHODS," the disclosure thereof incorporated by reference herein in its entirety.

FIELD

The present disclosure relates generally to transportation intelligence, and more specifically to systems and methods for enhanced identification of transit location.

SUMMARY

Embodiments of the present disclosure provide systems and methods for tracking information relating to transportation vehicles. For example, some embodiments of the disclosure provide a system for enhanced location and data collection from vehicles traveling along a vehicle pathway. The system may include a communications mesh architecture of vehicle tags and anchors affixed to segments of a vehicle pathway. For example, the vehicle may be a light rail train, a commuter train, a freight train, an automobile, an airplane, a ship, a space vehicle, a ski lift, a gondola, or other forms of transportation as known in the art. The transportation pathway may be any pathway along which the respective vehicle moves, such as a train track, a road, a canal or shipping lane, a runway, an airway, or other vehicle pathways as known in the art. By providing a communications mesh architecture, the enhanced transit location system may be fault tolerant while still providing highly accurate, real-time location data for vehicles.

The system may include a mesh network of anchors and vehicle tags. Both the anchors and the vehicle tags may incorporate impulse-radio ultra-wideband (IR-UWB) transceivers for both distance ranging and backhaul data transmission, together with the transmission of other attributes relevant to vehicle tracking, including vehicle speed, charge or fuel levels, warning flags, etc.

Vehicle tags may be mounted in the front and/or the back of vehicles, or vehicle segments (e.g., train cars). The vehicle tags may obtain ranging data and distance information from anchors affixed along a vehicle pathway (e.g., a train track, train tunnel, road, etc.). As the vehicle moves along the vehicle pathway, the vehicle tags may transmit a data beacon (e.g., a "ping") and anchors may respond with a corresponding anchor identification signal including a unique identifier for the respective anchor, together with a relative distance from the vehicle tag.

The vehicle tag on the vehicle may receive the anchor identification signal. The vehicle tag may also include a processor and a non-transitory computer readable memory with computer executable instructions embedded thereon, the computer executable instructions configured to cause the processor to compute real-time multilateration. The vehicle tag may inject the vehicle's location (e.g., an x-y coordinate, x-y-z coordinate, track number and distance) into a backhaul. The backhaul may represent a chain of anchors proximately located to one another and extending along the vehicle pathway.

In some examples, the vehicle may be a subway train, the vehicle pathway may be the train track, train track substrate, or subway tunnel, and the backhaul may be the chain of anchors extending along the train track, train track substrate, or subway tunnel to a base station (e.g., a border anchor).

Anchors may include a processor and a non-transitory computer readable memory with computer executable instructions embedded thereon, the computer executable instructions configured to cause the processor to compute relative distance to an approaching vehicle tag.

The anchor may transmit the relative distance of the vehicle tag, together with location data, through the backhaul to a bridge anchor. To enhance reliability, accuracy, and fault tolerance, anchors may be positioned in relatively close proximity to one another at regular intervals along the backhaul. In some examples, the anchors may be placed along girders along the walls of the tunnel spaced between 6 and 20 meters apart.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
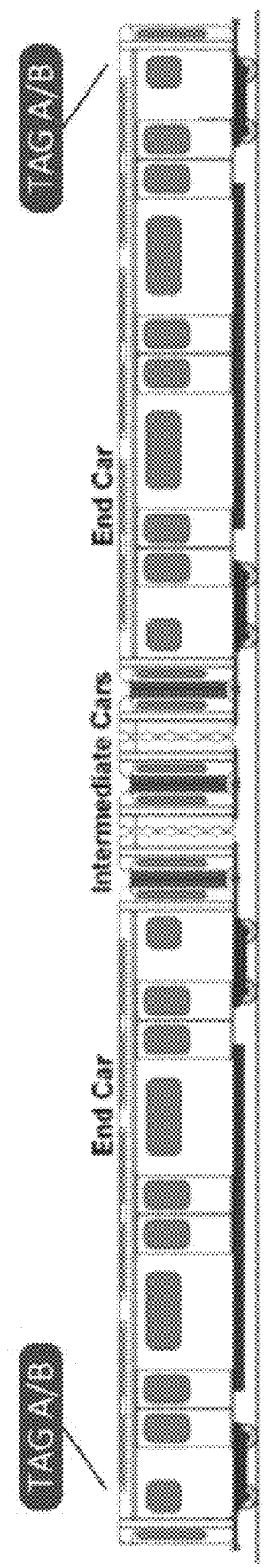
FIG. 1 illustrates placement of tags on a group of connected train cars, commonly referred to as a "consist," according to embodiments of the disclosed technology.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the present disclosure provide systems and methods for enhanced location and data collection from vehicles traveling along a vehicle pathway. In some embodiments of the disclosure, a system for enhanced location and data collection includes a plurality of vehicle tags and a plurality of anchors (also referred to herein as "anchors" and "readers") configured to communicate using a mesh network technology. For example, the vehicle tags and anchors may include IR-UWB localization transceivers.

In some examples, the vehicle may be a train and the vehicle pathway may be a train track, train platform, or train tunnel, such as a subway tunnel system. The interaction between anchors mounted high on the girders in the tunnel and vehicle tags installed on the trains may facilitate collection of the geolocation of a given train. As a train moves through the tunnel, time-of-arrival (TOA) and/or time-of-flight (TOF) may be measured between anchors and vehicle tags. The vehicle tags may include processors and non-transitory computer readable memory with computer executable instructions embedded thereon, the computer executable instructions configured to cause the processor to compute real-time multilateration to effectively triangulate the vehicle tag's location and inject the train's track position and distance from a previous train station into the backhaul. Vehicle tags may include a data store or be communicatively coupled to a data store, e.g., using a wireless network. The data store may include location data for multiple anchors in the system. The vehicle tags may be configured to identify and distinguish intersecting points on the track and intersecting points behind a wall in order to identify correct vehicle tag geolocation.

In some examples, interactions between stationary (e.g., anchor sensors mounted on stationary structures) and moving sensors (e.g., tag sensors mounted on moving vehicles) will produce sensor signals that can be processed by a distributed sensor network (e.g., comprising anchors and tags) for accurate positioning of vehicles with respect to stationary structures. The localization data generated by the distributed sensor network may be made available to a vehicle tracking system to track and display relative positions and other characteristics relating to the vehicles.

Using a network of sensors as described herein may overcome problems associated with retrofitting a vehicle tracking system in an existing transportation system (e.g., existing subway or train systems). For example, in an existing subway system in which no network infrastructure exists inside tunnels, providing location signals to a central vehicle tracking system requires a wireless network. Existing subway trains may not have the technical means to transfer their position data in real time. Additionally, based on the cost of providing electrical power into the tunnels to power, any viable system must be able to provide its own power or use existing power systems, e.g., on a moving train. Embodiments disclosed herein solve these problems by measuring data on localization of the trains inside tunnels using tag sensors mounted on the trains and transmitting the collected data wirelessly towards both tunnel entrances/ends where the data can enter the existing subway network infrastructure available on subway stations (e.g., using a backhaul network of anchor sensors). Transmitting data to both tunnel ends may also introduce redundancy and increase reliability.

FIG. 1 illustrates placement of tags on a group of connected train cars, commonly referred to as a "consist," according to embodiments of the disclosed technology. As illustrated, in some examples, the vehicle may be a train and the vehicle pathway may be a subway tunnel system. However, other example vehicles and vehicle pathways may employ the same system, as would be understood by a person of ordinary skill in the art.

Referring to FIG. 1, a plurality of tags may be disposed on distal ends of each end car of the consist. For example, a pair of tags may be disposed on the top of each end car. In FIG. 1, each pair of tags is labeled "TAG A/B". Each tag in a pair of tags may operate independently. For example, each tag a pair may independently generate a position measurement.

Figure 2:
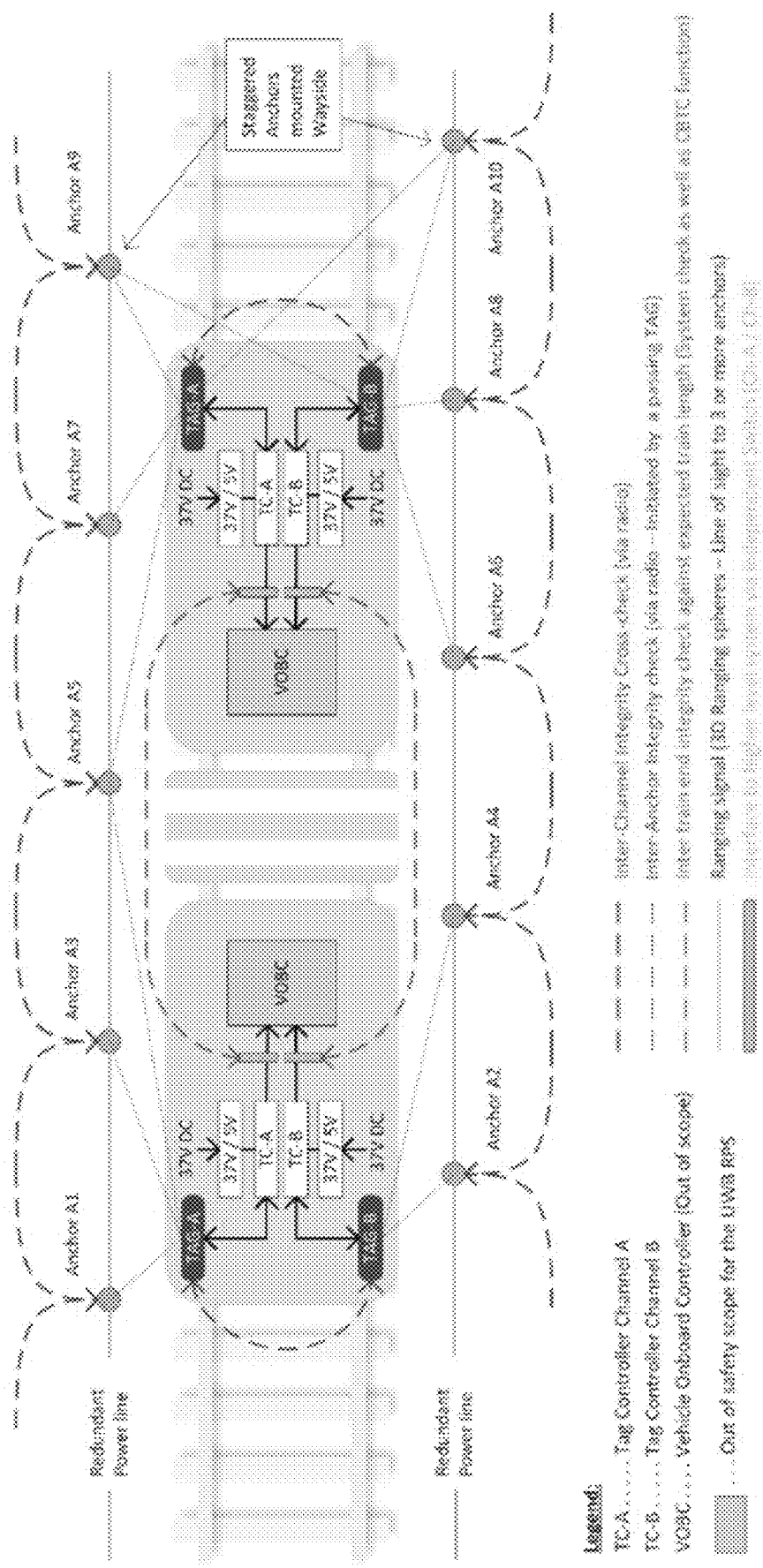
FIG. 2 illustrates a train location and communication system according to embodiments of the disclosed technology.

FIG. 2 illustrates a train location and communication system according to embodiments of the disclosed technology. Referring to FIG. 2, a consist comprising a plurality of cars is traveling along a track. As in FIG. 1, a pair of tags TAG A and TAG B may be located at each end of the consist. The tags in a pair may be located on opposite sides of the consist. Each tag may communicate with anchors on a respective wayside of the consist.

Each tag may communicate independently with a suspected tag controller TC. In the example of FIG. 2, each tag A may communicate with a tag controller TC-A, and each tag B may communicate with a separate tag controller TC-B. The tag controllers TC-A, TC-B may communicate with a vehicle onboard controller (VOBC) through a respective system interface. The system interfaces in the end cars may communicate, as shown by the broken green arrows, for example to check a length of the consist against an expected consist length. The tags in a pair of tags may communicate with each other, as shown by the broken blue lines, for example to perform inter-channel integrity cross-checks. The tags and a pair of tags may communicate with each other by radio.

The system may include a plurality of anchors A1-A10 located along the waysides of the track. In the example of FIG. 2, odd-numbered anchors A1-A9 are distributed along one wayside, while even-numbered anchors A2-A10 are distributed along the other wayside. In one embodiment, the spacing between anchors may be approximately 250-300 feet. The locations of the anchors may be staggered to reduce the likelihood of dead zones. For example, each anchor may be located halfway between two anchors on the opposite wayside.

The anchors may communicate with the tags. In the example of FIG. 2, each tag may communicate with multiple anchors through line-of-site communications, as shown by the broken red lines. In some embodiments, these communications are implemented using ultra wideband (UWB) technology.

The anchors may communicate with each other. In the example of FIG. 2, each anchor on a wayside communicates with the adjacent anchors on the wayside, as shown by the broken purple lines, for example to perform inter-anchor integrity checks. These checks may be initiated following detection by an anchor of a passing tag. The anchors may form a mesh network. For example, should an anchor fail, the adjacent anchors may communicate directly with each other rather than attempt communications through the failed anchor.

Figure 3B:
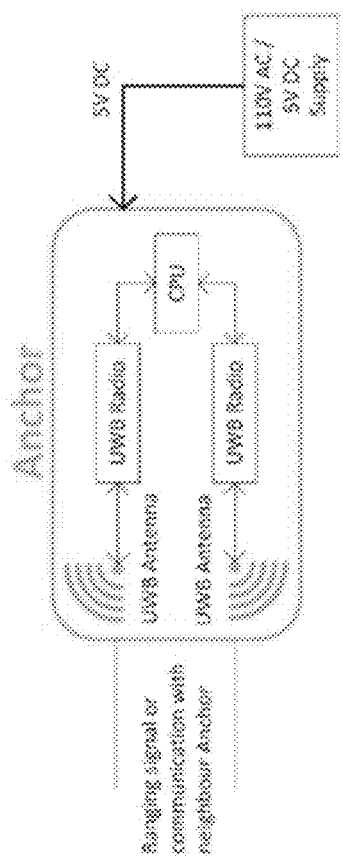
FIG. 3B illustrates an architecture of an anchor according to some embodiments of the disclosed technology.
Figure 3A:
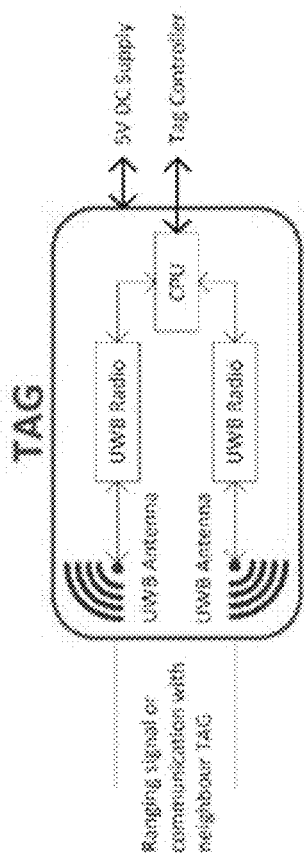
FIG. 3A illustrates an architecture of a tag according to some embodiments of the disclosed technology.

FIG. 3A illustrates an architecture of a tag according to some embodiments of the disclosed technology. Referring to FIG. 3A, each tag may include a UWB radio and a UWB antenna. In some embodiments, each tag may include two UWB radios and two UWB antennas to support redundancy requirements. Each tag may include a CPU in communication with the UWB radios and a tag controller. Each tag may employ the UWB radios and antennas to communicate with the anchors, and with other tags. Each tag may be powered by an onboard power supply. In the example of FIG. 3A, each tag is powered by a 37V DC supply, stepped down to 6V DC.

Some embodiments of the tag may include one or more of the elements and features that follow. For example, the tag may include a UWB radio operating across 6 channels between 3.5 GHz and 6.5 GHz for precision ranging and data communication. The tag may include a micro USB jack for power and communication with a tag controller. The tag may include an omni-directional UWB antenna. The tag may include a weather resistant plastic housing. The tag may include an aerodynamic teardrop enclosure for the UWB antenna. The anchors may perform distance ranging with tags installed on trains up to a 125 meter radius, given an optimal LOS environment. Tags may be securely provisioned over BLE.

FIG. 3B illustrates an architecture of an anchor according to some embodiments of the disclosed technology. Referring to FIG. 3B, each anchor may include a UWB radio and a UWB antenna. In some embodiments, each anchor may include two UWB radios, and two UWB antennas, to support redundancy requirements. Each anchor may include a CPU in communication with the UWB radios. Each anchor may employ the UWB radios and antennas to communicate with the tags, and with other anchors. The anchors may be powered by a wayside power supply. In example of FIG. 3B, each anchor is powered by a 110V AC power supply, converted to 6V DC.

Some embodiments of the anchor may include one or more of the elements and features that follow. For example, the Wi-Fi radios may include two 2×2 MIMO 6 GHz transceivers for data communication, and a 2×2 MIMO 2.4 GHz transceiver for provisioning and maintenance. One 6 GHz radio may be used to send data in one direction (e.g. North), while the other 6 GHz radio may be used to send data in the other direction (e.g. South). This arrangement may provide a full-duplex solution mitigating per-hop bandwidth degradation. Any data received by a 6 GHz radio may be forwarded to the UWB radio and sent to the tag, for example as dictated by routing tables. Anchors may be securely provisioned over BLE.

The ethernet interface may include two Gigabit Ethernet controllers. The antennas may include four directional 6 GHz antennas for data communication, two omnidirectional 2.4 GHz antennas for maintenance, and a high-gain bi-directional UWB antenna. The UWB radio may operate across 6 channels between 3.5 GHz and 6.5 GHz for precision ranging and data communication. The anchor may include two externally-accessible buttons for provisioning, power reset, and the like. The anchor may include a main 120 Volt AC to 12 Volt 2.5 Amp switching power supply. The anchor may include an impermeable plastic housing with heat sink for thermal management. The anchor may provide UWB ranging responses to a tag when queried. The anchors may configure their two 6 GHz radios to form the WDS network. The anchor may receive IP data from a tag and forward those data to a border router. The anchor may receive IP data from a border router and forward those to a tag. The border routers may be implemented using an anchor, for example by adding an Ethernet jack, which may be threaded for weather resistance.

Figure 4:
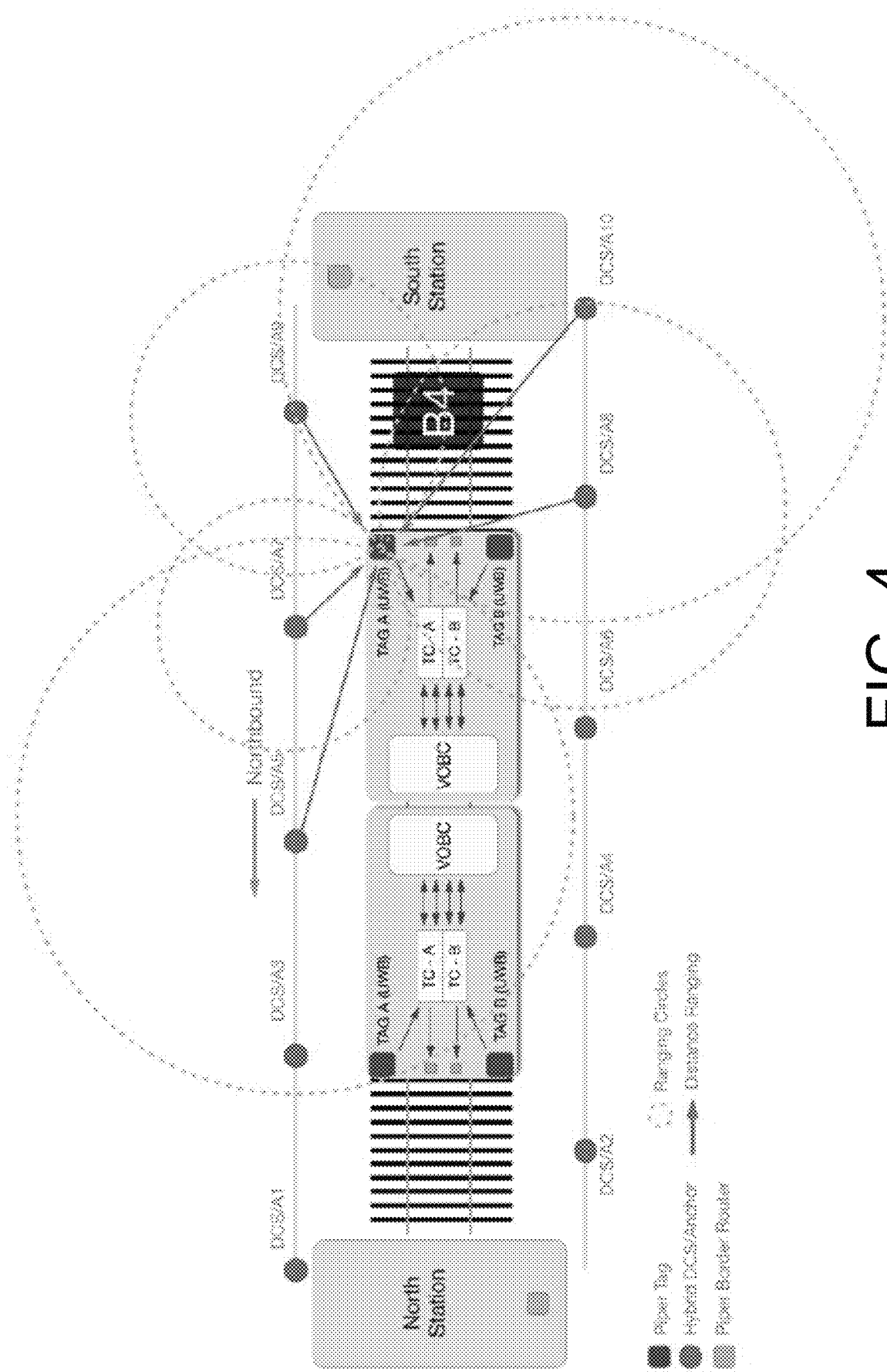
FIG. 4 illustrates a positioning architecture according to embodiments of the disclosed technology.

FIG. 4 illustrates a positioning architecture according to embodiments of the disclosed technology. Referring to FIG. 4, the tags may perform distance ranging using signals transmitted by the anchors, as shown by the green arrows and broken blue lines. For example, each anchor may transmit a radio pulse. The radio pulse may identify a position of the respective anchor, an identity of the respective anchor from which its position may be determined, and the like. The tag controllers may determine a location of the consist based on the radio pulses, known positions of the anchors, a mathematical model of the track, and the like. The tag controllers may provide the location of the consist to the VOBC. For example, the location may be included in a UDP packet provided to the VOBC. The VOBC may forward the packet to a control center.

The tag controller may be the main on-board processing unit for collecting ranging data to compute location and for sending and receiving data from the WDS Network. The tag controller may include two physically and electrically identical and separate sides, which may be responsible for data communications and ranging, respectively. Each side may be connected to a tag. The A-side may provide data sent and received by the VOBC to the WDS network through its tag. The B-side may receive raw ranging data from its tag, process it to compute the location of the train, and send the resulting location to a positioning system. For example, the data may be sent via UDP to a set of IP addresses on the train's LAN belonging to the positioning system. The tag belonging the A-side may be mounted on the port side of the train, with the B-side on the starboard side, or vice versa. Each tag may be connected to its respective side of the tag controller by a USB cable or the like.

The tag controller may include two separate single-board computers (one for each side, A and B) in a one rack unit case. There may be two tag controllers per consist. The tag controllers may be supplied power by a UPS, with direct USB power output, connected to a 110 VAC outlet provided by the train. Each tag controller may include two identical sets of the following ports: a 6V USB-A power input, a USB-A input for interface with a tag, two RJ-45 Ethernet ports for the transmission of ranging and positioning data, and a USB-A Debug Port.

The tag controller B-side may broadcast a Location Update message every 600 ms. The location update message may contain: a tag_id that identifies the tag to which the reported is referenced, an edge_id that identifies the guideway edge on which the train is located, an offset that represents arc length measured on the edge from the starting node of the edge, [x, y, z] representing a reported location of the train in 3D local coordinates, an estimated flag identifying whether the position of the train is "measured" or "estimated."

Figure 5:
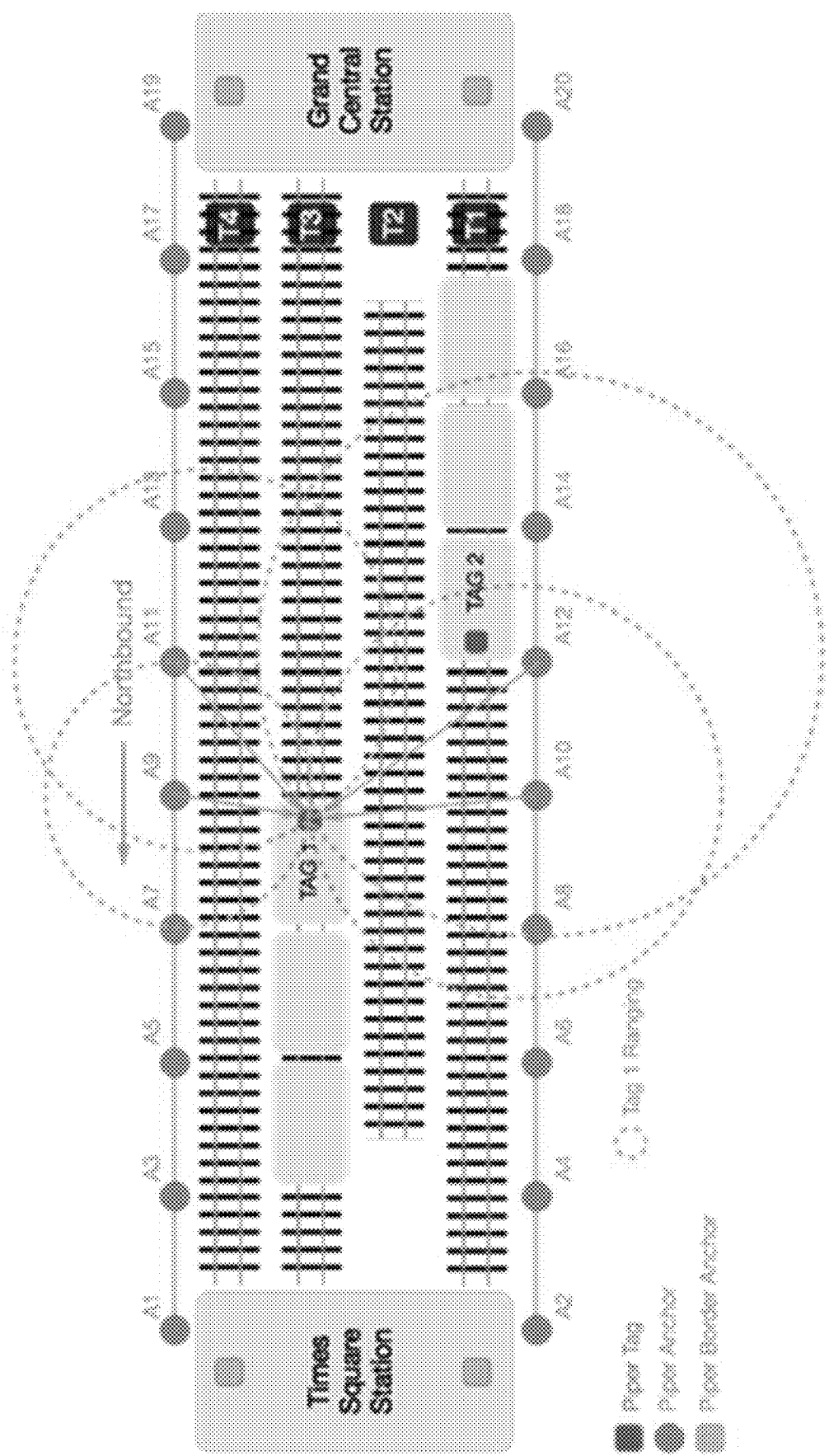
FIG. 5 illustrates an embodiment for a subway tunnel having multiple tracks T1-T4.

FIG. 5 illustrates an embodiment for a subway tunnel having multiple tracks T1-T4. In such embodiments, the location of the consist may indicate on which track the consist is located in addition to a location along the track.

Figure 6A:
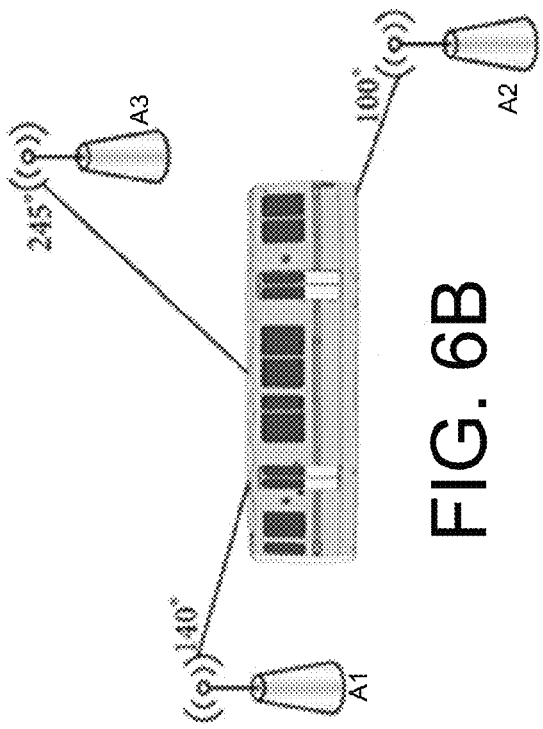
FIGS. 6A-6C illustrate example methods for location determination consistent with embodiments disclosed herein.
Figure 6B:
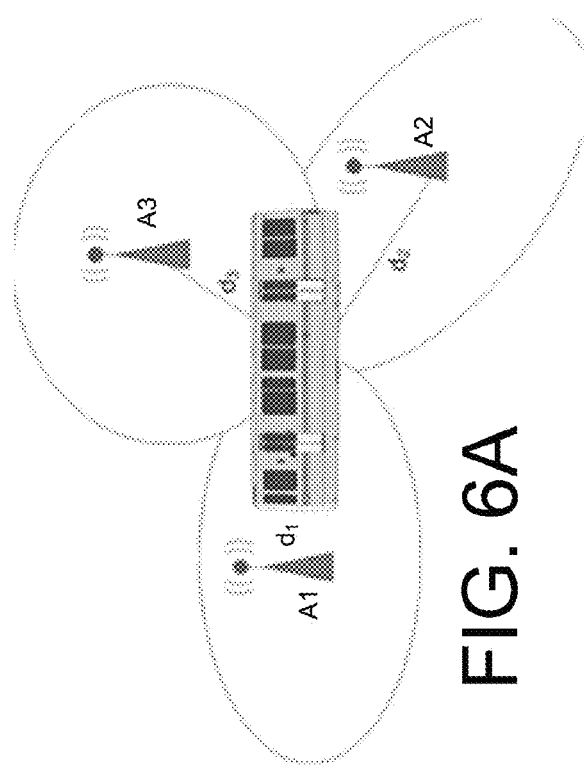
Figure 6C:
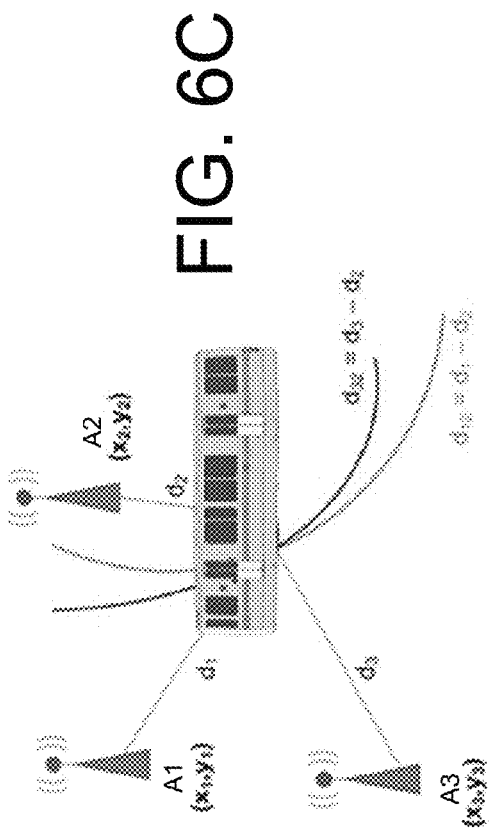

FIGS. 6A-6C illustrate example methods for location determination consistent with embodiments disclosed herein. It should be noted that these methods are presented only by way of illustration and should not be considered limiting. Other methods may be employed for location determination instead of, or in addition to, one or more of these example methods.

FIG. 6A illustrates a Time of Arrival (TOA) method in which a tag is located at intersection of three ranging circles each centered at one of three anchors A1, A2, and A3. In this method, also referred to as triangulation, the location may be determined according to intersections of the three ranging circles.

FIG. 6B illustrates a Time Difference of Arrival (TDOA) method in which a tag is located at the intersection of three hyperbolas for which foci are the locations of three anchors A1, A2, and A3. In this method, also referred to as trilateration, the location may be determined according to intersections of the hyperbolas.

FIG. 6C illustrates a Direction of Arrival (DOA) method in which a tag receives signals from three anchors A1, A2, and A3 located at different angles from the tag. In this method, the location of the tag may be determined according to the angles and the locations of the anchors.

Figure 7:
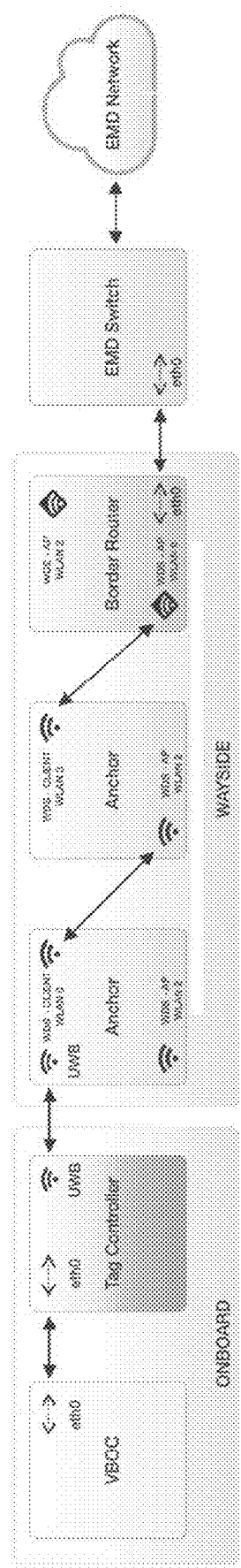
FIG. 7 illustrates a data communication system according to some embodiments of the disclosed technology.

FIG. 7 illustrates a data communication system according to some embodiments of the disclosed technology. Referring to FIG. 7, onboard components include the VBOC, one or more tag controllers, and one or more tags (not shown). In the example of FIG. 7, the VBOC and the tag controller may communicate over an ethernet connection. However, other connections may be used instead of, or in addition to, an ethernet connection.

In the example of FIG. 7, the wayside components may include a plurality of anchors and a border router. Each anchor may include a UWB radio for communication with the tags. Each anchor may include one or more Wi-Fi radios for communication with other anchors in a wireless distribution system (WDS). Within each anchor, the one or more Wi-Fi radios may implement a client and an access point (AP). In the embodiments of FIG. 7, the WDS clients may belong to a first wireless network WLAN 0, while the access points may belong to a second wireless network WLAN 2. In these embodiments, a client of one anchor may connect to an AP of another anchor.

In the embodiments of FIG. 7, each border router may include one or more Wi-Fi radios for communication with anchors in the WDS. Within each border router, the one or more Wi-Fi radios may implement a client and an AP. Anchors may connect to the client or the AP of a border router. Each border router may include an ethernet interface for communication with an EMD switch, for example using gratuitous ARP (GARP). This provides the necessary information for the EMD Switch to update its routing tables and port assignments in order to continue to route data correctly from a zone controller to the tag, and ultimately the VOBC. The EMD switch may provide access to the EMD network, and to one or more control centers (not shown).

Figure 8:
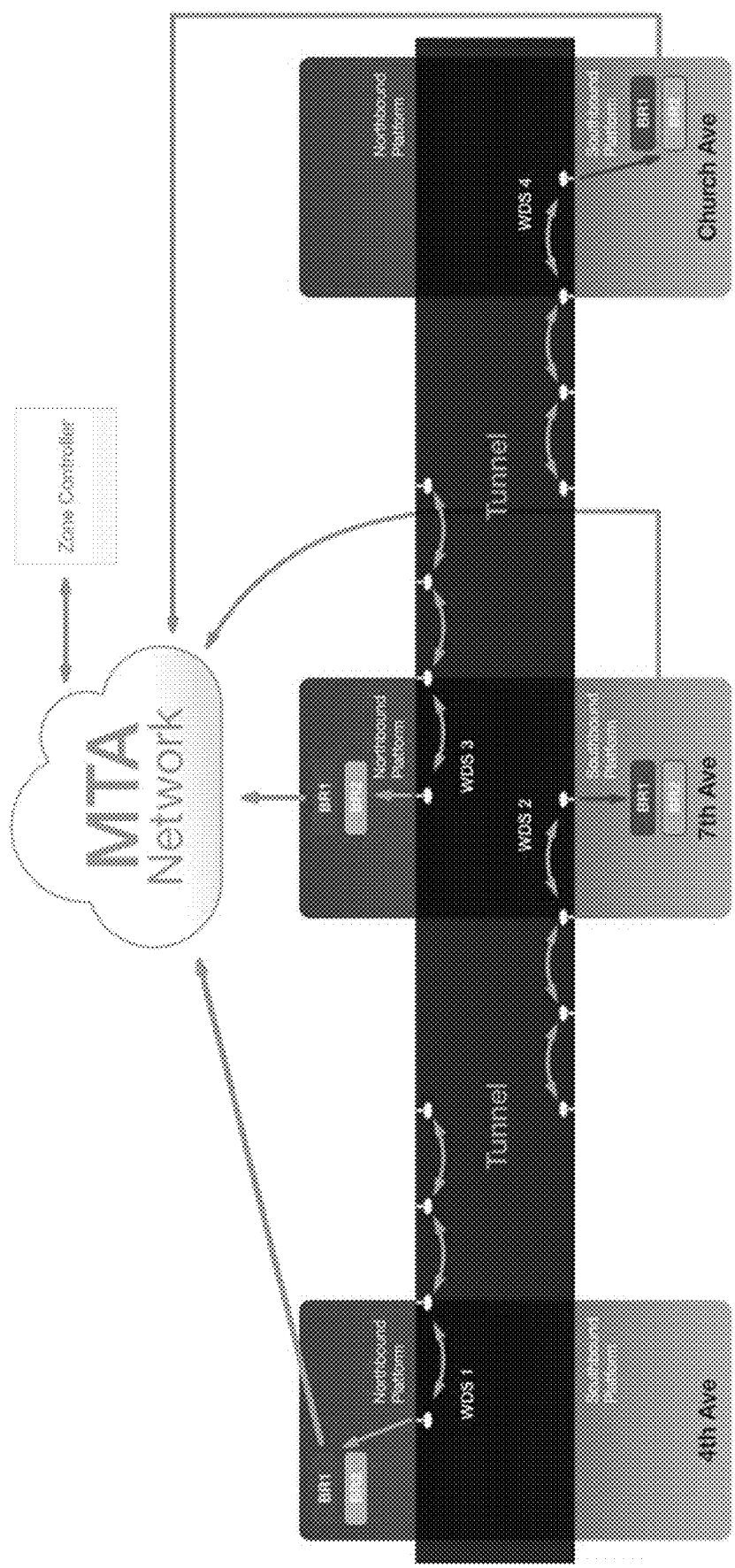
FIG. 8 illustrates a distributed communication system that includes four WDS networks WDS1-WDS4.

In some embodiments, multiple WDS networks may be established, with each WDS network connecting to a central network through one or more border routers. FIG. 8 illustrates a distributed communication system that includes four WDS networks WDS1-WDS4. Each WDS network includes a chain of anchors, each communicating with at least one adjacent anchor. Each WBS network communicates with a central network (labeled "MTA Network" in FIG. 8) through at least one border router. In the example of FIG. 8, redundancy may be achieved using two border routers for each WBS network, with one border router BR1 active, and the other border router BR2 passive. Should the active border router fail, the passive border router may take over as the active border router.

The anchors may transmit beacons periodically, for example 3-10 times per second. Each beacon may contain the tunnel location of the anchor transmitting the beacon. The tunnel location may include a relative distance to an origin. The anchors receive the beacons and use data included in the beacons, as well as RSSI of the received beacon to create routes from the anchors to the border routers. The routing may minimize latency by hopping over adjacent anchors to a distant anchor with adequate RSSI. Because RSSI may be affected by train location, the routing algorithm may take into consideration the location of the train in order to route around the train by dynamically and temporarily shortening the hop distance.

Figure 9:
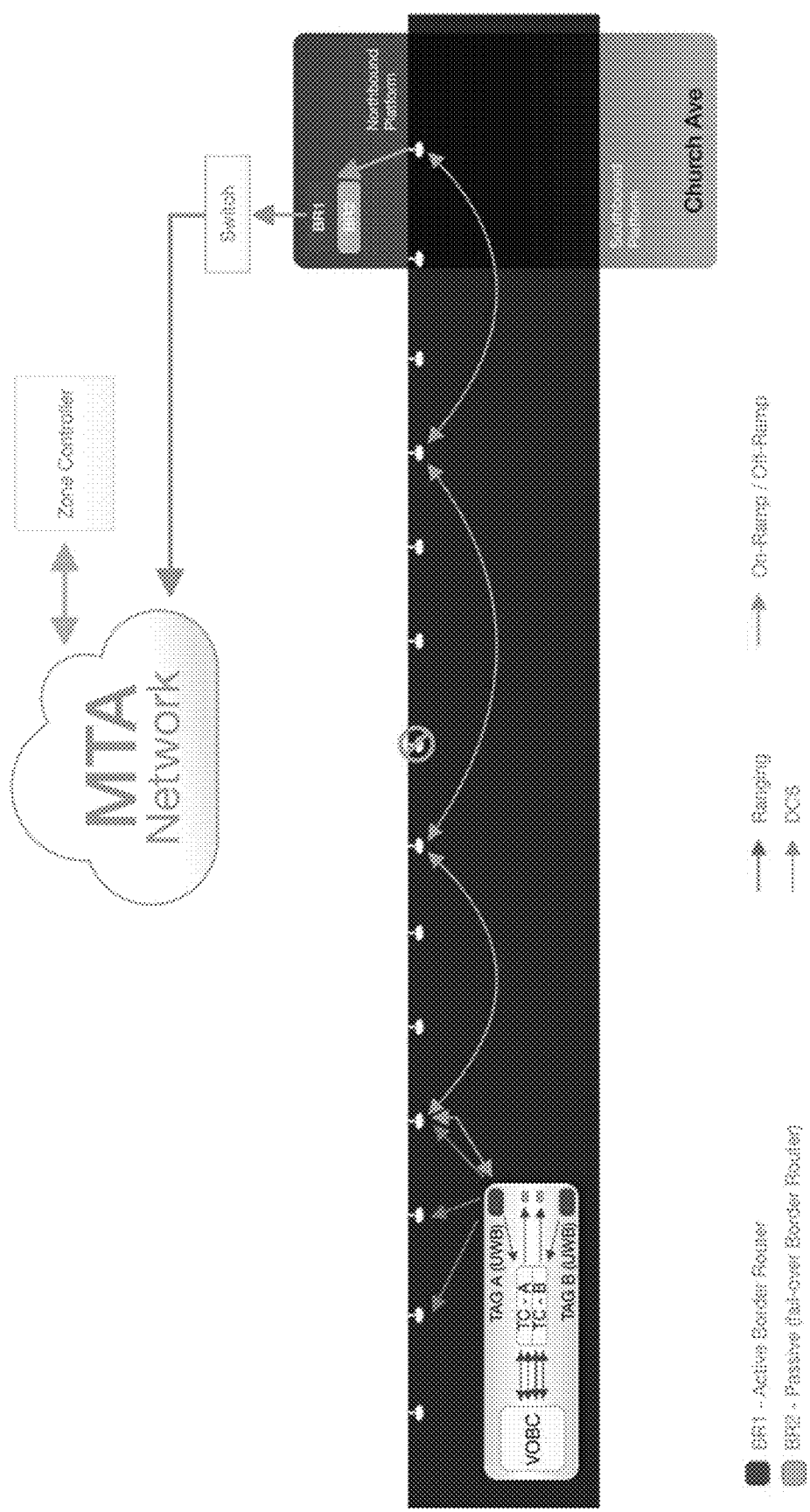
FIG. 9 illustrates a WDS where at least one anchor failed, as indicated by the red circle.

The WDS may be designed such that any single anchor failure will not affect overall throughput or latency. The anchors may regularly send and receive beacons and heartbeat messages. The beacon data may be sent from the border routers along the anchors until they anchor with no further neighbors (referred to herein as "leaves"). Likewise, anchors that are leaves may originate heartbeat messages that are sent along the anchors to the border routers. In this manner, health data is sent in both directions. The anchors and border routers use these data (or lack thereof) to determine the health of adjacent anchors. If a certain number of heartbeats or beacons are missed, surrounding anchors may consider the failing anchor down and route around the anchor. FIG. 9 illustrates a WDS where at least one anchors failed, as indicated by the red circle. An adjacent anchor is routed around the failed anchor to complete a WDS connection to the border router. Once the anchor is back on line, routing to that anchor may resume. In this manner, the WDS is self-healing. As illustrated in FIG. 9, anchors can also route around anchors that have not failed, for example to achieve a WDS with fewer hops, and therefore less latency.

Figure 10:
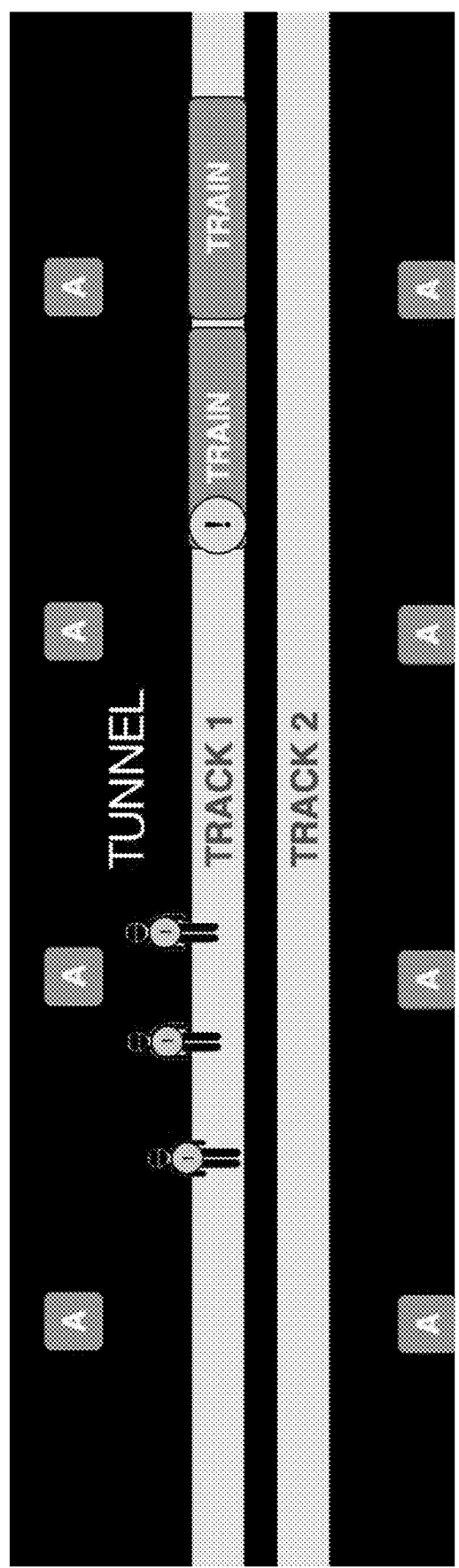
FIG. 10 illustrates an architecture for a railway worker protection system according to some embodiments of the disclosed technology.

As described above, the disclosed WDS networks may be used to relay train location information to control centers for use in managing the trains and the like. The disclosed WDS networks have many other applications. One such application is railway worker protection. FIG. 10 illustrates an architecture for a railway worker protection system according to some embodiments of the disclosed technology.

In some embodiments, the system may use train location information to automatically inform railway workers of an approaching train. In these embodiments, one or more railway workers may have a communication device to receive this information and to alert the railway workers, for example according to safe separation rules that specify minimum distances, maximum speeds, and the like, for trains near railway workers. Train position information or warnings can be transmitted to the railway workers directly when they share a WDS network with the train. When the train and the railway workers are on different WDS networks, the train position and information or warnings can be relayed between the WDS networks through the border routers and the central network.

In some embodiments, the railway workers may wear wearable devices that may connect to the anchors. In these embodiments, the position of the railway workers may be transmitted to the train so the operators may slow or stop the train as appropriate.

In either of these embodiments, the position information may be routed to a central controller that may transmit warnings to the railway workers and/or the train operator. In some embodiments, the central controller may automatically control the train using the position information.

Figure 11:
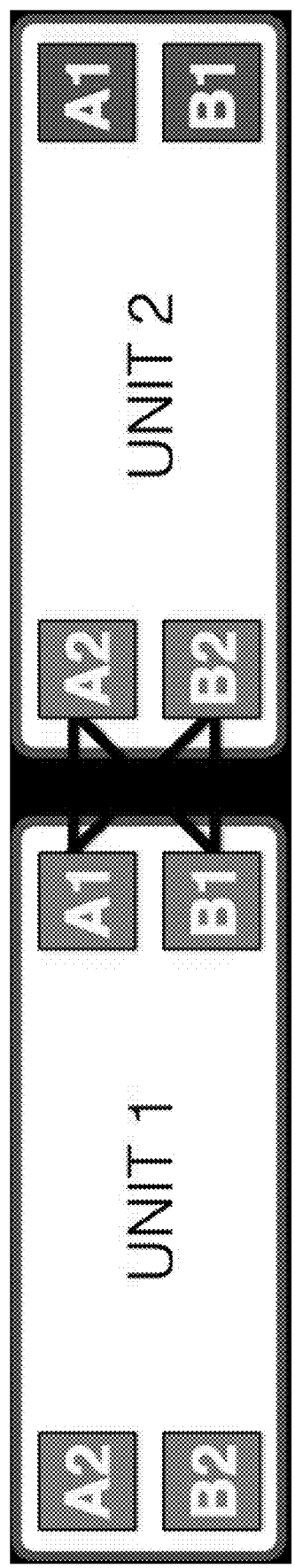
FIG. 11 illustrates the architecture of an inter-train network according to some embodiments of the disclosed technology.

In some embodiments, the tags mounted on the train cars may be employed to create an inter-train network. FIG. 11 illustrates the architecture of an inter-train network according to some embodiments of the disclosed technology. In FIG. 11, only two train cars UNIT 1 and UNIT 2 are shown. However, it should be understood that one or more cars may be coupled between those cars. In the example of FIG. 11, each end car includes 2 pairs of tags mounted on opposite ends of the cars. While the distal pairs of tags, shown in green, perform the ranging and distributed communication functions described above, the proximal pairs of tags, shown in blue, communicate with each other form an inter-train network. In some embodiments, all of the cars in a consist may be connected by an inter-train network to form a fully-connected train. A fully-connected train may deliver numerous applications. In some examples, the network may be used for purposes of train operation. In some embodiments, the network may be used by passengers of the train, for example to access the Internet, cellular communications, and the like.

In train management, one important function is to ensure that the number of cars in a consist equals the number of cars expected to be in the consist. When a consist has fewer cars than expected, one or more of the cars may be missing on the track and may present a significant safety hazard. Currently, this function is achieved by stationary wayside equipment that counts the number of axles in the consist, and the like. In some embodiments, discounting function may be implemented using the disclosed tags and anchors. For example, an anchor may count the passing tags of a consist to determine the number of cars in the consist. This information may be relayed to a central controller, zone controller, or the like for comparison with the expected number of cars for the consist. In the event of a mismatch, the controller may take one or more actions. For example, the actions may include warning train operators, controlling trains, and the like.

Another important function in train management is asset management. In some embodiments, the disclosed location and communication system may be employed to perform asset management. This asset management may include periodic monitoring of assets. For example, the system may periodically transmit messages containing data describing assets, trending data, and the like. Asset management may include reporting detected conditions. For example, the system may alert on specified asset changes or abnormal conditions, such as high radio temperature, firmware version changes, and the like. Asset management may include on-demand monitoring, for example such as performing specific monitoring actions on-demand. A second monitoring may include monitoring management. For example, the system may provide remote management functions such as modifying configuration parameters, performing corrective actions, and the like.

This asset management may include remote software deployment. For example, the system may allow users to stage, verify, install, modify, rollback, and uninstall packages remotely. The system may allow users to deploy complex rules, condition checks, and the like.

This asset management may include remote readiness checks. For example, the system may check in return asset information and status for onboard systems. The scoring system may be employed to assess the current state of the onboard systems, and compare the relative readiness of units. The scoring system may be, for example, pass/fail, a numerical score, and the like.

As mentioned above, some embodiments employ an Ultra-Wideband (UWB) localization methodology. For example, location tracking may be based on interaction between anchors and tags. In some examples, time-domain UWB (TD-UWB) or software defined radio (SDR) UWB (SDR-UWB) may be used. TD-UWB may provide multiple spectra instantaneously while SDR-UWB may provide an equivalent spectrum using several sequential signal transmissions. In either methodology, time-of-arrival (TOA) and/or time-of-flight (TOF) may be measured between anchors and tags. Measurements of TOA using TD-UWB may be performed using, for example, the 802.15.4 range measurement protocol. Measurements of TOA using SDR-UWB may be performed using Multi-Carrier (MC) UWB (MC- UWB) and other algorithms. The whole operational cycle for transmitting, receiving and processing such TOA signals may be comparable for both TD-UWB and SDR-UWB options. Anchors may be mounted in stationary positions on the walls and/or ceiling of stationary structures (e.g., subway tunnels) and tags may be mounted on vehicles (e.g., train cars, the train side walls, or roofs). In some examples, readers may be installed on the vehicle walls or roofs with tags installed on stationary structures. Geolocation data may be transferred to both ends of the stationary structures (e.g., subway tunnels) to make them available to control centers through the network gateways available in the stations. In some examples, anchor and/or tags may be powered by small batteries. The batteries may be made permanently chargeable from suitable energy harvesting devices. The difference between consumed power and power obtained from harvesting may be made small or close to zero to extend battery lives.

In some examples, an enhanced location tracking system may implement reader devices and passive or active tags. For example, passive tags may include RFID tags.

In some examples, two or more transceivers may be implemented on tags to communicate with a UHF RFID reader. Location estimation may implement techniques such as Received Signal Strength Indicator (RSSI), Time of Arrival (TOA), Time Difference of Arrival (TDOA), and fingerprint methods, as described herein.

For TOA localization, a tag may be visible simultaneously to several readers. Localization capabilities of tags can be further improved by implementing "trajectory" tracking algorithms, e.g., car coordinates will be derived not just from a single observation but from a set of consecutive measurements and predicted in a processor. Machine learning algorithms (e.g., Gaussian process regression with interpolation/extrapolation, etc.) may also be implemented to improve accuracy.

TD-UWB chips configured to operate as readers may communicate to each other to exchange the TOA data to be processed for geolocation. Because no network infrastructure is available inside the subway tunnels, the system must provide networking functionality in tunnels. For low-power low-rate data exchange as expected for tag geolocation data, the 915 MHz band may provide a suitable option. Because TD-UWB chip-based readers do not support this communication protocol, an additional transceiver may be used to enable 915 MHz wireless networking.

SDR-UWB geolocation has many similar features to the TD-UWB geolocation described above. The main difference lies in implementation. TD-UWB generates pulsed signals of instantaneous wide spectrum. SDR-UWB can produce wide spectra through frequency-stepping by generating one-by-one several/many CW tones or a sequence of a few baseband signals. In SDR-UWB such received signal components are processed to "synthesize" equivalent time-domain UWB signals. A typical SDR can form digital baseband signals up to 60-60 MHz instantaneous bandwidth with several hundreds MHz clocks. Overall time-budget for full transmission-reception-processing cycles of UWB signals in TD-UWB and SDR-UWB can be comparable because time-domain reception is not performed in true real-time in TD-UWB, but through sequential sampling. SDR-UWB waveforms can be updated at a rate of 10-20 μs. A hundred of such produced spectral components would be sufficient to "synthesize" an arbitrary UWB pulse at a time budget of a few ms to enable ≥100 Hz refresh rate for SDR-UWB geolocation.

In SDR-UWB, wider signal bandwidth requires more power supply while narrower signal bandwidth requires less power supply. Certain minimal UWB signal bandwidths would be required to provide major system functionality such as (1) good range resolution and precision, (2) multipath spread mitigation, and others. Such bandwidth will be assessed first in simulations and then verified in hardware tests.

In SDR-UWB, one-way tag-reader communication protocol, which is power saving, can be implemented using multi-carrier UWB (MC-UWB) positioning methods. MC-UWB uses transmission of several (many) sub-carriers with equalized (zeroed) initial phases. When such a signal is received, its FFT is performed and phases of all dominated spectral components may be measured and processed to estimate TOA. Multi-access (multi-tag) coding may be provided by setting and/or weighting particular sub-carrier components (binary weights 0/1 or a few bit weighting).

In a typical TD-UWB chip, at least a half the power is consumed by clocks which are permanently running, while SDR-UWB could be set to operate with lesser power demands. Also, SDR-UWB tunable narrowband receivers could be more sensitive compared to sampler-based TD-UWB receivers. Finally, SDR-UWB based radios should have a better RF power budget than TD-UWB radios.

In some examples, UWB-SDR may include a reprogrammable radio set for networking in addition to its geolocation operational functions. In particular, SDR supports 915 MHz communication. A typical SDR chip has several Tx/Rx antenna terminals, implementing at least a 2×2 MIMO scheme. Thus, one pair of Tx and Rx antenna terminals can be used to support geolocation, and a second pair of the Tx and Rx terminals can be used to operate the 915 MHz networking as sketched below for a generic 2×2 Tx/Rx MIMO SDR chip.

Additional ad-hoc wireless networking is required to transfer all tag positioning data to dedicated external users. For example, all geolocation measurements can be transferred to the tunnel ends where they can enter the existing subway network available on subway stations. For this transfer, the same 915 MHz frequency or UWB mesh are options. This can be achieved by installing along tunnels a set of distributed repeaters or store-and-forward functionality.

In some examples, a network mesh of UWB nodes may be connected by firmware to create a mesh and communicate the tag position data to the previous and next station gateways simultaneously.

Figure 12A:
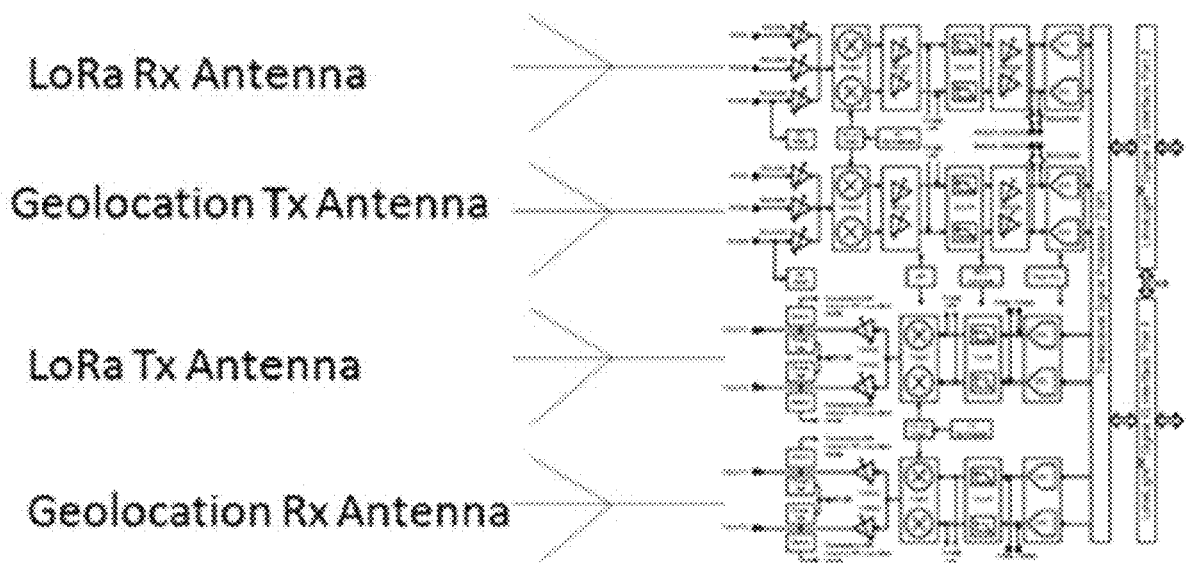
FIGS. 12A and 12B illustrate example transceiver devices that may be implemented in an enhanced location tracking system consistent with embodiments disclosed herein.
Figure 12B:
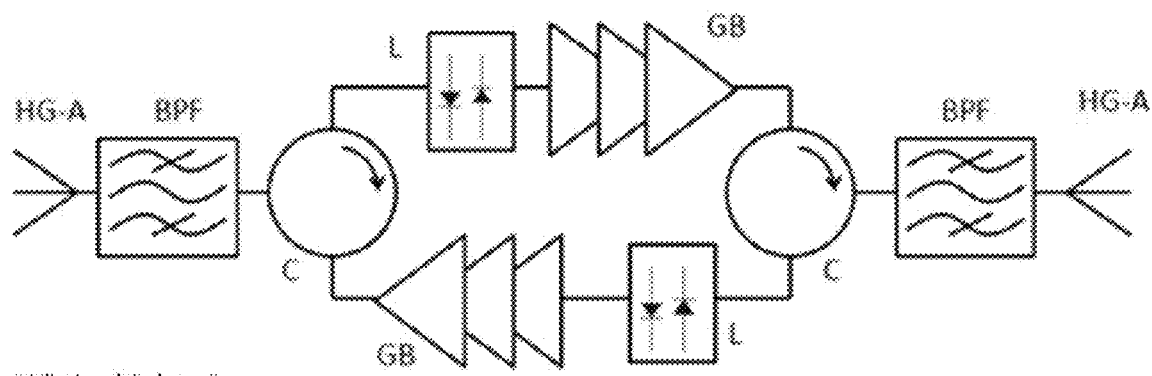

FIGS. 12A and 12B illustrate example transceiver devices that may be implemented in an enhanced location tracking system. For example, FIG. 12A illustrates an example 2×2 Tx/Rx SDR layout to enable both geolocation and 915 MHz operations. Both geolocation and networking operational functions may use different types of antennas connected to their respective Tx/Rx terminals. The antennae may be omnidirectional, 180-deg, high gain, circular arrays, or other antennae as known in the art.

A system for enhanced location tracking may implement different example communication modes. For example, a TOA data communication exchange between all readers involved in geolocation of the same tag may be implemented to combine individual TOA measurement for tag geolocation. In some examples, communication between readers and in-tunnel network nodes to gather the computed tag geolocation data may be implemented. In some examples, communication inside an in-tunnel network may be used to transfer the computed geolocation data to both tunnel ends/ entrances to make them available through the in-station subway network gateways.

In some examples, 915 MHz frequency low-power wireless networks may be implemented by the system. In other examples, Bluetooth, ZigBee, Wi-Fi, or cellular, may be used. FIG. 12B illustrates an example communications module consistent with embodiments disclosed herein.

In some examples, a UHF/UWB hybrid radio with asymmetric wireless links may be implemented as an anchor and/or a tag. In the downlink (reader-tag), similar to a conventional passive backscattering RFID, a transmission protocol at UHF may be adopted to control and power-up the tag. In the uplink (tag-reader), the energy scavenged from the UHF CW accommodates an IR-UWB transmitter to send data for a short time duration at a high data rate.

A real-time locating system (RTLS) solution may be implemented. Operating at low frequencies, e.g., within the AM broadcast band (530-1710 kHz), NFER systems may exploit the near-field behavior of radio signals within ~one-third of a wavelength. If close to a small antenna, the electric and magnetic components of radio waves are ninety degrees out of phase. Far from a small transmit antenna, these components converge to be in phase. By separately detecting, measuring, and comparing the electric and magnetic phases, distance measurements may be obtained.

Some example systems may implement LIDAR to provide distance to a target by illuminating that target with a pulsed laser light and measuring the reflected pulses with a sensor. Some example systems may implement millimeter-wave (MW) radar.

Figure 13:
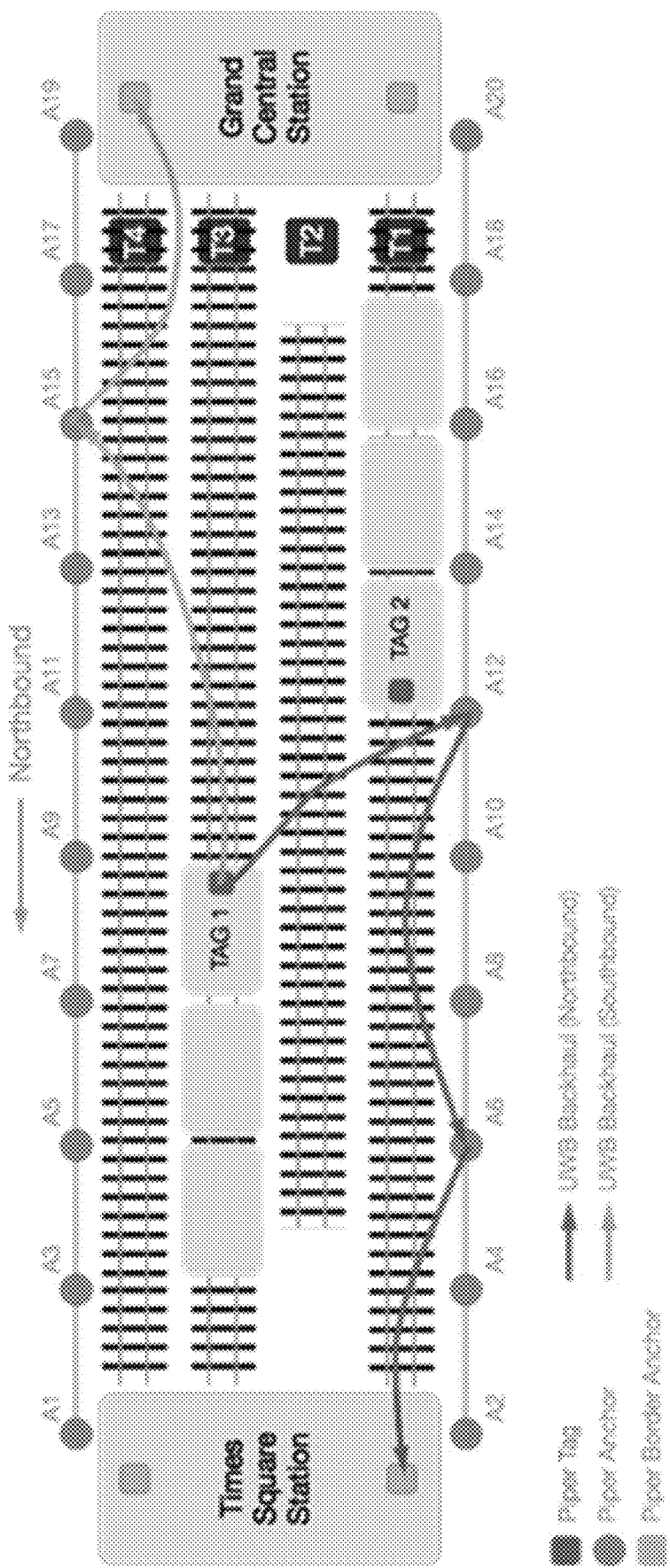
FIG. 13 illustrates an example system for enhanced location and data collection from vehicles traveling along a vehicle pathway, consistent with embodiments disclosed herein.
Figure 14:
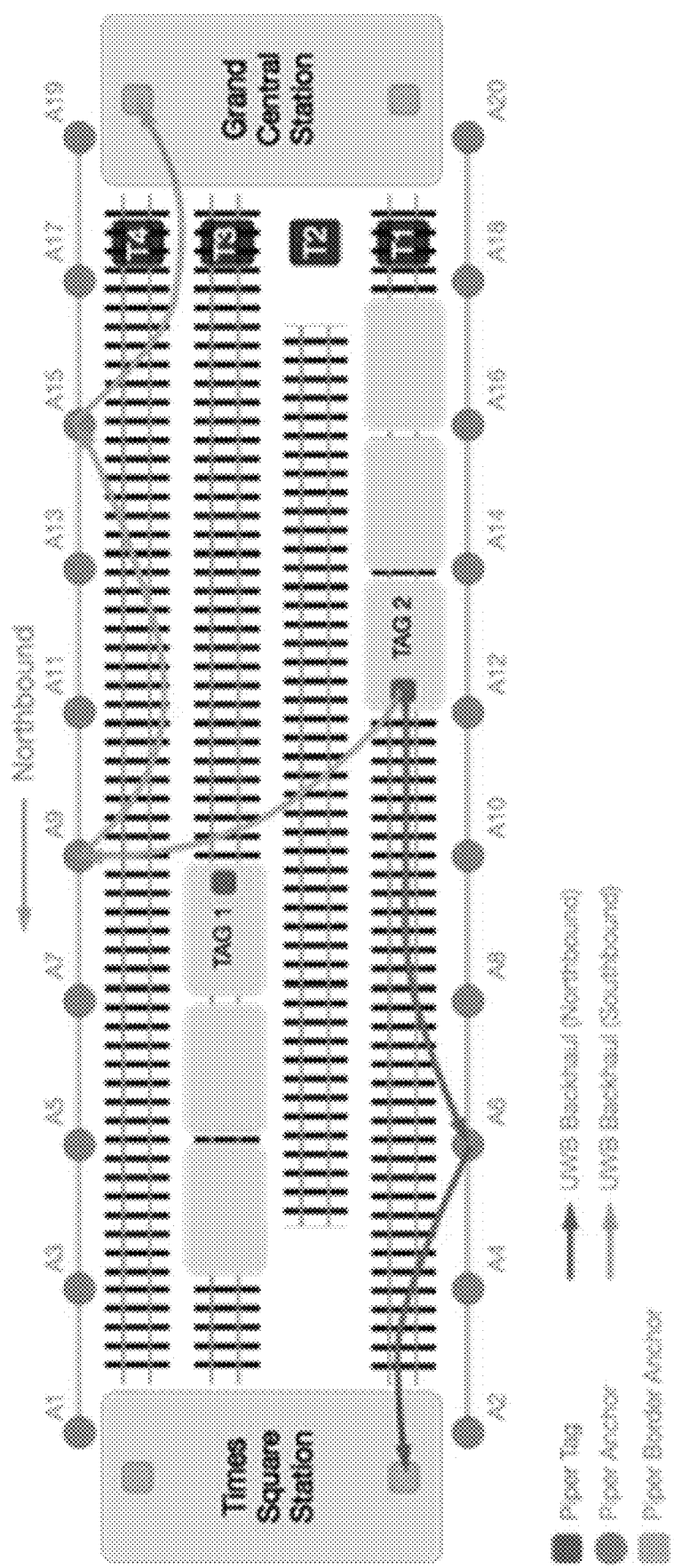
FIG. 14 illustrates an example system for enhanced location and data collection from vehicles traveling along a vehicle pathway, consistent with embodiments disclosed herein.

In some examples, anchors in a first wall adjacent to the vehicle pathway (e.g., a West wall) may forward packets along a corresponding backhaul (e.g., Northbound), and anchors along a second wall adjacent to the vehicle pathway and opposite the first wall (e.g., an East wall) may forward packets along a corresponding backhaul (e.g., Southbound). FIG. 13 illustrates a location data signal being propagated along multiple backhauls from a tag TAG 1 on a Northbound train to two border routers (also referred to herein as "border anchors"). FIG. 14 illustrates a location data signal being propagated along multiple backhauls from a tag TAG 2 on a Southbound train to two border routers. In some embodiments, a location data signal may be propagated in both directions by one or both backhauls.

When a vehicle tag has calculated its position, it may inject (e.g., transmit) its location into the backhaul by sending data to the farthest anchor it can reach (e.g., which is still in range) in the direction that the train is heading, and the nearest anchor (n+/−1) it can reach in the opposite direction. The receiving anchors forward the location data to the farthest anchors they can reach, respectively. This forwarding process may be repeated iteratively until the location data reaches the base stations (e.g., border anchors). The location data may then be transmitted to a centralized enhanced transit location system (ETLS). In some examples, the ETLS may be a cloud-based computer server or network of computer servers.

Figure 15A:
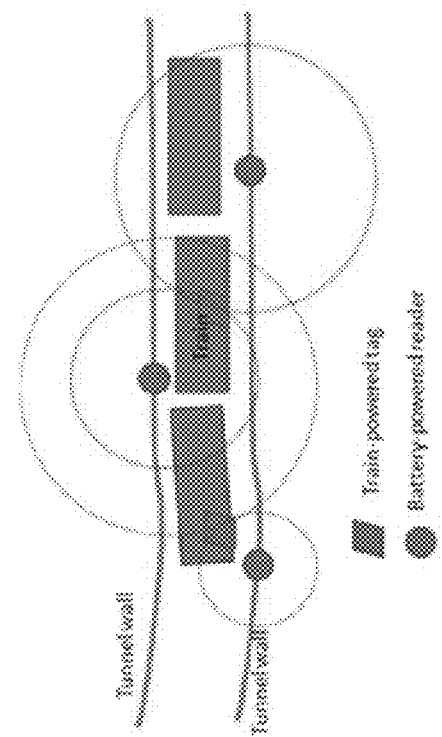
FIGS. 15A-15D illustrate example spatial anchor-tag layouts, consistent with embodiments disclosed herein.
Figure 15B:
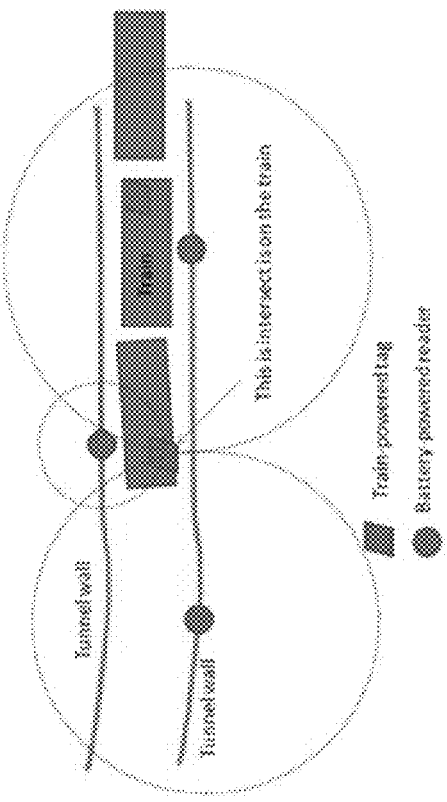

FIGS. 15A, 15B, 15C, and 15D illustrate example spatial anchor-tag layouts. For example, FIG. 15A illustrates an example configuration implementing anchors on both tunnel side walls to locate a tag on a car roof. In another example illustrated by FIG. 15B, anchors on opposite tunnel side walls locate a tag on a car roof. In the example of FIG. 15B, the ranging circles of the anchors intersect in two locations, creating an ambiguity. But because one intersect is within the tunnel wall, it can be discarded, resolving the ambiguity.

Figure 15C:
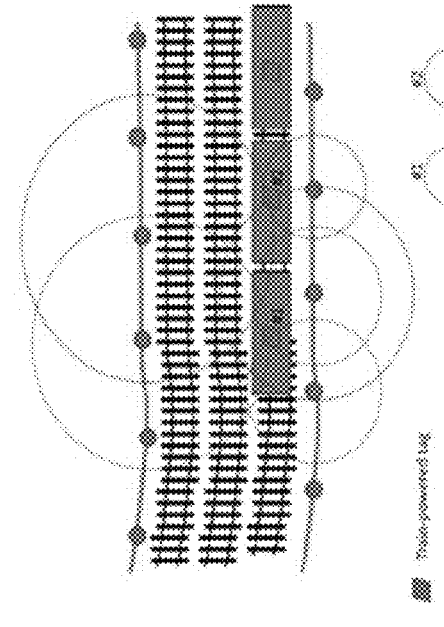
Figure 15D:
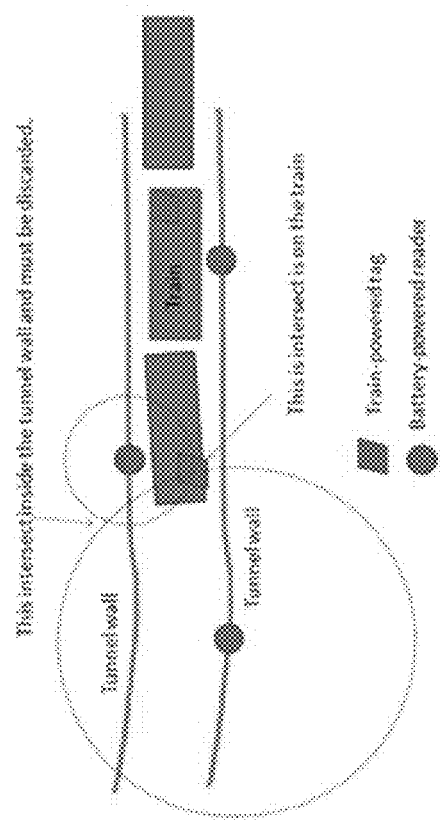

In another example illustrated in FIG. 15C, anchors on both tunnel side walls locate two tags on roofs of respective cars. FIG. 15D illustrates a multi-track configuration. In such configurations, using multiple anchors to introduce redundancy may improve accuracy, for example to determine on which track the train is located.

In some examples, the backhaul may include an auto-healing chained mesh. Each backhaul packet may be acknowledged by the receiving anchor (n). In the event that an anchor (n) fails to acknowledge a packet for any reason, the transmitting anchor (x) may attempt to reforward the packet to an alternate receiving anchor (n−1). To optimize this process, backhaul anchors may be weighted as a function of their reliability to successfully forward packets, such that the most reliable path is used for any given environment.

The anchors may calculate and transmit relative distance to an approaching vehicle tag as well as transmit location data through the backhaul to border routers (also referred to herein as "bridge anchors"). A bridge anchor may serve as an Internet gateway to the UWB backhaul. Example bridge anchors may transmit vehicle location data to a cloud. Bridge anchors may be installed at access points to the vehicle pathway, such as ingress and egress points for train tunnels. The bridge anchors may be communicatively coupled to the Internet via wired or wireless networking technology.

In some embodiments, a cloud may aggregate vehicle location data from bridge anchors and provide a real-time user interface, e.g., using a graphical user interface as disclosed herein.

In some examples, vehicle tags may be mounted on an external surface of a vehicle. In the example of a subway train, vehicle tags may be affixed to the front and/or rear of individual train cars. Vehicle tags may obtain ranging and distance data, e.g., as provided in data signals transmitted from anchors along the vehicle pathway. The vehicle tag may transmit a ping. The anchors may respond to the ping with a corresponding anchor identification signal. In some examples, the anchors may also transmit a relative distance from the vehicle tag that transmitted the initial ping. The vehicle tag may calculate real-time multilateration and inject location data into the backhaul.

In some embodiments, a vehicle tag may include one or more UWB radios operating across multiple channels (e.g., between 3 and 12 channels). In some examples, the radios may operate in a range between 3.5 GHz and 6.5 GHz. Example vehicle tags may include a high gain bi-directional antenna, a low gain hemispherical antenna, a Bluetooth low-energy 2.4 Ghz radio for device provisioning, an ultra-low power microcontroller, controller buttons or switches, a battery pack, and/or a DC power input for energy harvesting device or external power supply. Example vehicle tags may also include a micro-computer (e.g., a Linux based 1 GHz SBC, or other microcomputer as known in the art). Example vehicle tags may also include a power input port (e.g., a micro-USB DC power input, or other power supply port as known in the art). A vehicle tag may be securely provisioned over BLE with a unique vehicle identification.

In some embodiments, the vehicle tags may include two transceivers, e.g., UWB radios. The transceivers may be positioned to transmit and receive data in opposite directions, such that a first transceiver may obtain vehicle ranging data in coordination with the anchor devices, and a second transceiver may transmit and receive location data down the backhaul. By mounting a tag on each side of a vehicle (e.g., a front of a train and a back of a train), a front-facing tag may use a front facing transceiver to obtain ranging data and use a back facing transceiver to transmit the ranging data to an onboard computer and the rear-facing tag. The rear-facing tag may use its rear facing transceiver to transmit location data down the backhaul.

Some embodiments of the disclosure provide a method for improving accuracy of an enhanced transit location system. A method for improving accuracy of an enhanced transit location system may include coupling a digital image sensor (e.g., a digital camera) to a vehicle tag and positioning the digital image sensor longitudinally along the travel axis of the vehicle so as to capture image data in front of or behind the vehicle as it moves. Survey markers may be provided along the travel path of the vehicle (e.g., a train track or a road) within the field of view of the digital image sensor. The method may include obtaining image data from the digital image sensor while the vehicle is in motion, identifying the vehicle position at any given time based on visual queue captured in the image data from the survey markers, and verifying the vehicle position identified from the vehicle tags and anchors using the vehicle position identified from the image data.

Some embodiments of the disclosure provide a provisioning app. For example, to facilitate provisioning, installation, and testing of the system, a mobile device application may be deployed on a smartphone (e.g., a ruggedized smartphone) and distributed to personnel responsible for installing and testing the UWB equipment in the field. The provisioning app may be communicatively coupled to anchors using a secure wireless connection, e.g., Bluetooth or WiFi. Anchors may communicate with nearby anchors within range to communicate current location for one or more vehicle tags and a proximate survey marker in order to reduce provisioning time for anchors. A list of survey markers may be stored in a database located in the cloud and synchronized with the provisioning app when the provisioning app is connected to the network. In addition to provisioning, the provisioning app may include a ranging feature for testing the overall health of the UWB backhaul.

Figures 16A, 16B, 16C:
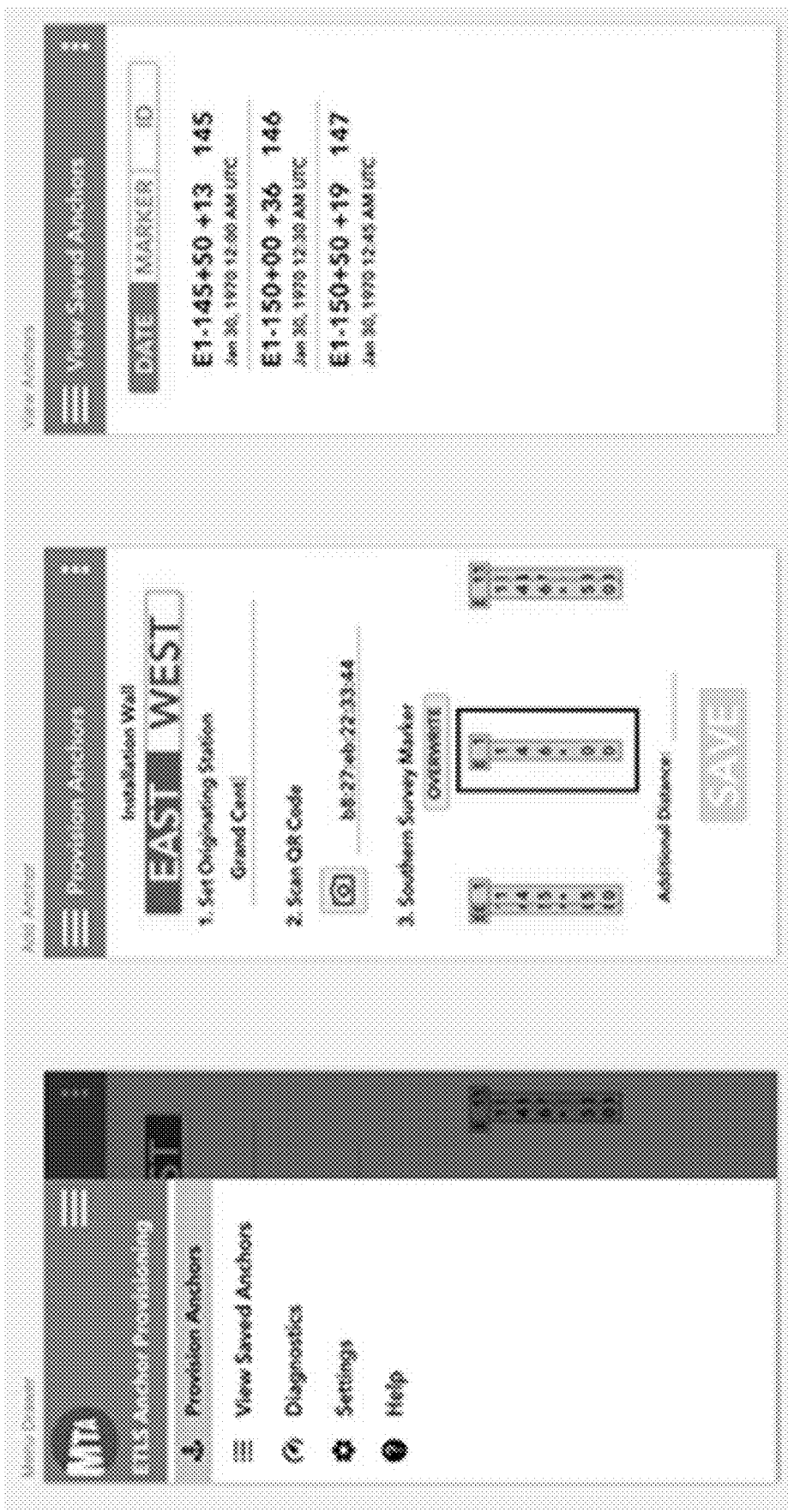
FIG. 16A illustrates an example graphical user interface for an app for communicating and interacting with a system for enhanced location and data collection from vehicles traveling along a vehicle pathway, consistent with embodiments disclosed herein.
FIG. 16B illustrates an example graphical user interface for an app for communicating and interacting with a system for enhanced location tracking, consistent with embodiments disclosed herein.
FIG. 16C illustrates an example graphical user interface for an app for communicating and interacting with a system for enhanced location and data collection from vehicles traveling along a vehicle pathway, consistent with embodiments disclosed herein.

FIGS. 16A-16C are screenshots of displays provided by an example provisioning app illustrating anchors being provisioned based on Installation Wall, Originating Station, Anchor MAC address (scanned via QR code or manually entered) and distance from the survey marker to the south of the anchor.

Figure 17A:
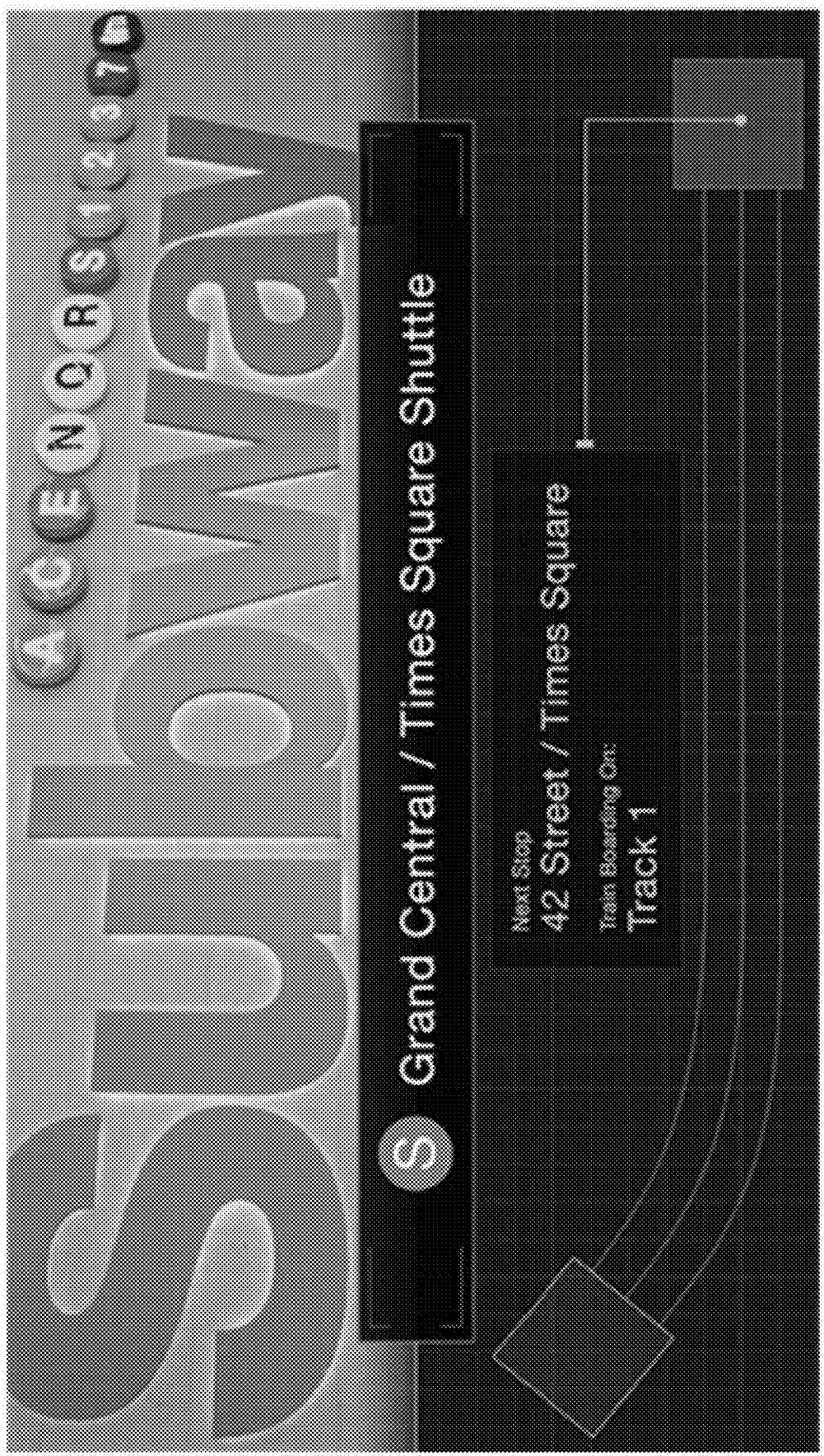
FIG. 17A illustrates an example graphical user interface for displaying data from a system for enhanced location and data collection from vehicles traveling along a vehicle pathway, consistent with embodiments disclosed herein.
Figure 17B:
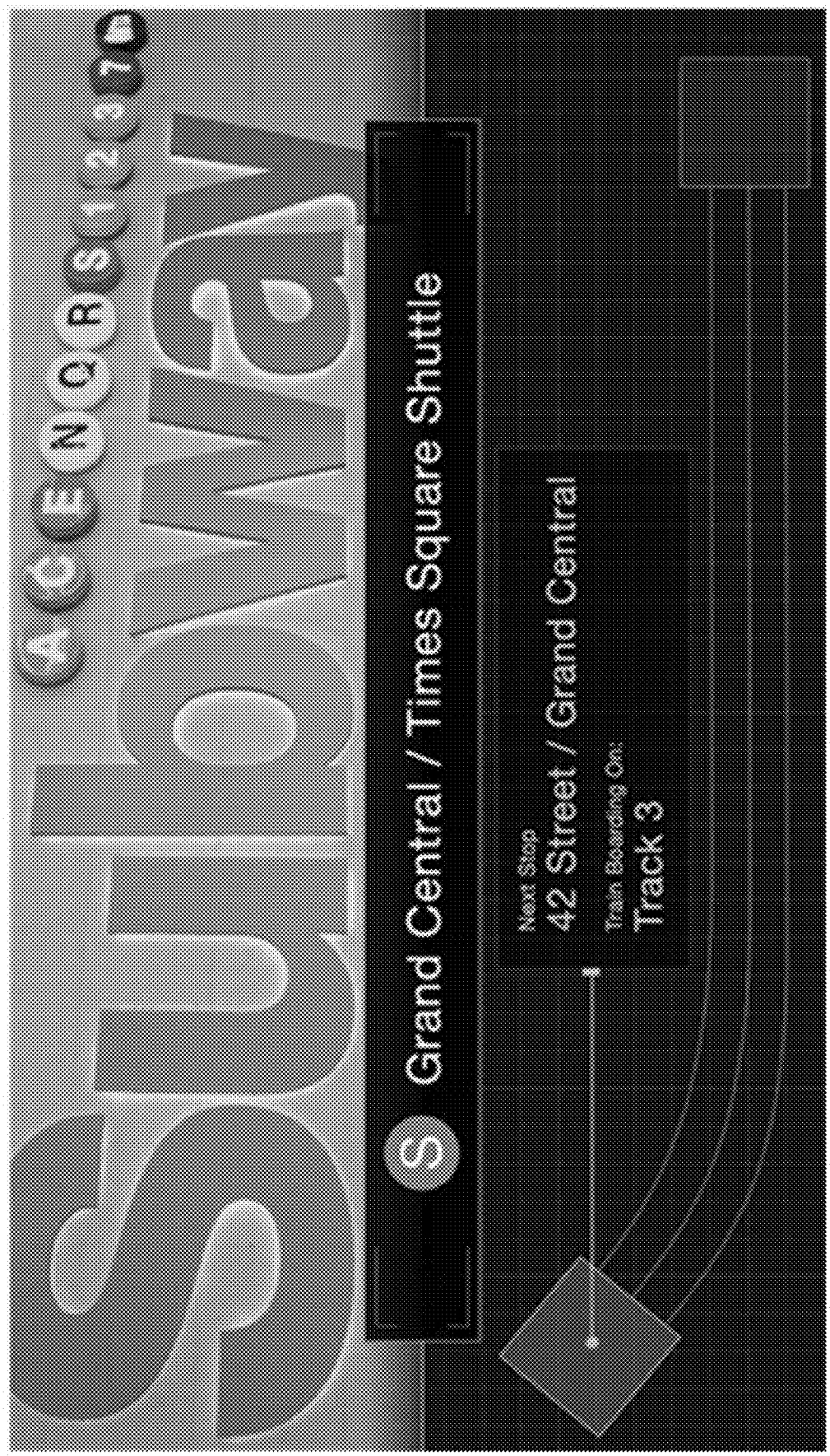
FIG. 17B illustrates an example graphical user interface for displaying data from a system for enhanced location and data collection from vehicles traveling along a vehicle pathway, consistent with embodiments disclosed herein.
Figure 17C:
FIG. 17C illustrates an example graphical user interface for displaying data from a system for enhanced location and data collection from vehicles traveling along a vehicle pathway, consistent with embodiments disclosed herein.
Figure 17D:
FIG. 17D illustrates an example graphical user interface for displaying data from a system for enhanced location and data collection from vehicles traveling along a vehicle pathway, consistent with embodiments disclosed herein.

FIGS. 17A-6D illustrate an example graphical user interface of an app for displaying vehicle positioning information. FIG. 17A illustrates a graphical user interface showing a graphical view of a next station on the line highlighted along with what track the train is departing from. FIG. 17B illustrates a graphical user interface showing a graphical view of a train track with the line highlighted along with what track the train is leaving from. FIGS. 17C and 17D illustrate graphical user interfaces displaying animations of vehicle locations on a line along with corresponding data received from tags and/or anchors. The user interface may display the track that a train is on with the station at the far edge of the page. In some examples, the station background image may fade out. In some examples, the train background image may fade-in. The user interface may provide a "heads-up display" (HUD) to display and/or scroll data on a screen. In the animation, the train may move from the side of screen until it reaches the horizontal middle of the screen, then stay centered. The track may then move with survey markers updating based on train position in the tunnel.

In some examples, the user interface may update data displayed in real-time or semi-real-time. For example, distance along a backhaul and/or speed data for a given vehicle may be updated regularly within the user interface.

As will be appreciated, the methods described herein may be performed using a computing system having machine executable instructions stored on a tangible medium. The instructions are executable to perform each portion of the method, either autonomously, or with the assistance of input from an operator.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. Various embodiments are described in terms of this example logical circuit 1100. After reading this description, it will become apparent to a person skilled in the relevant art how to implement the technology using other logical circuits or architectures.

Figure 18:
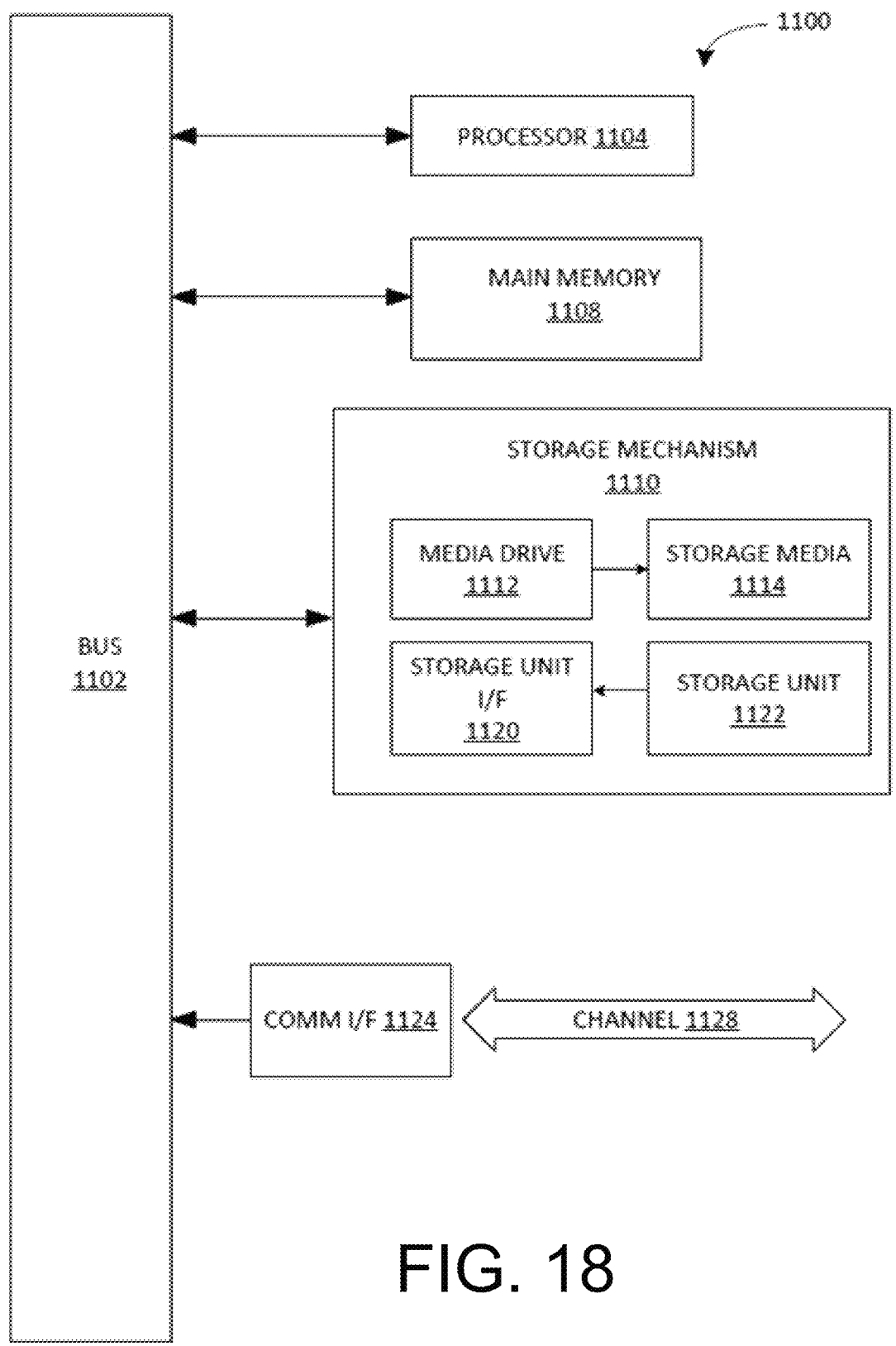
FIG. 18 illustrates an example computing system that may be used in implementing various features of embodiments of the disclosed technology.

Referring now to FIG. 18, computing system 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 1100 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control components, or other processing devices, such as a processor 1104. Processor 1104 might be implemented using a general-purpose or special-purpose processing component such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might also include one or more memory components, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to logical circuit 1100.

Logical circuit 1100 might also include a communications interface 1124. Communications interface 1124 might be used to allow software and data to be transferred between logical circuit 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 18 depicts a computer network, it is understood that the disclosure is not limited to operation with a computer network, but rather, the disclosure may be practiced in any suitable electronic device. Accordingly, the computer network depicted in FIG. 18 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of an component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a hardware processor; and
a non-transitory machine-readable storage medium encoded with instructions executable by the hardware processor to perform a method comprising:
receiving, into a vehicle radio located on a vehicle traveling along a roadway, signals transmitted by wayside radios located along the roadway; and
determining a location of the vehicle along the roadway based on the received signals.

2. The system of claim 1, the method further comprising:
transmitting the location from the vehicle to a first one of the wayside radios; and
relaying the location along the roadway from the first one of the wayside radios along one or more second ones of the wayside radios.

3. The system of claim 2, the method further comprising:
transmitting the location from one of the one or more second ones of the wayside radios to a control center.

4. The system of claim 1, the method further comprising:
determining a location of a roadway worker along the roadway; and
notifying the roadway worker working on the roadway when the vehicle is approaching the worker.

5. The system of claim 1, the method further comprising:
determining a location of a roadway worker along the roadway; and
controlling the vehicle when the vehicle is approaching the roadway worker.

6. The system of claim 1, wherein the vehicle comprises a plurality of cars each comprising one of the vehicle radios, the method further comprising:
establishing a communication network among the vehicle radios.

7. The system of claim 1, wherein the vehicle comprises a plurality of cars each comprising one of the vehicle radios, the method further comprising:
counting a number of vehicle radios passing one of the wayside radios; and
determining a number of the cars in the vehicle based on the counting.

8. A non-transitory machine-readable storage medium encoded with instructions executable by a hardware processor of a computing component, the machine-readable storage medium comprising instructions to cause the hardware processor to perform a method comprising:
receiving, into a vehicle radio located on a vehicle traveling along a roadway, signals transmitted by wayside radios located along the roadway; and
determining a location of the vehicle along the roadway based on the received signals.

9. The non-transitory machine-readable storage medium of claim 8, the method further comprising:
transmitting the location from the vehicle to a first one of the wayside radios; and
relaying the location along the roadway from the first one of the wayside radios along one or more second ones of the wayside radios.

10. The non-transitory machine-readable storage medium of claim 9, the method further comprising:
transmitting the location from one of the one or more second ones of the wayside radios to a control center.

11. The non-transitory machine-readable storage medium of claim 8, the method further comprising:
determining a location of a roadway worker along the roadway; and
notifying the roadway worker working on the roadway when the vehicle is approaching the worker.

12. The non-transitory machine-readable storage medium of claim 8, the method further comprising:
determining a location of a roadway worker along the roadway; and
controlling the vehicle when the vehicle is approaching the roadway worker.

13. The non-transitory machine-readable storage medium of claim 8, wherein the vehicle comprises a plurality of cars each comprising one of the vehicle radios, the method further comprising:
establishing a communication network among the vehicle radios.

14. The non-transitory machine-readable storage medium of claim 8, wherein the vehicle comprises a plurality of cars each comprising one of the vehicle radios, the method further comprising:
counting a number of vehicle radios passing one of the wayside radios; and
determining a number of the cars in the vehicle based on the counting.

15. A method comprising:
receiving, into a vehicle radio located on a vehicle traveling along a roadway, signals transmitted by wayside radios located along the roadway; and determining a location of the vehicle along the roadway based on the received signals.

16. The method of claim 15, further comprising:
transmitting the location from the vehicle to a first one of the wayside radios; and
relaying the location along the roadway from the first one of the wayside radios along one or more second ones of the wayside radios.

17. The method of claim 16, further comprising:
transmitting the location from one of the one or more second ones of the wayside radios to a control center.

18. The method of claim 15, further comprising:
determining a location of a roadway worker along the roadway; and
notifying the roadway worker working on the roadway when the vehicle is approaching the worker.

19. The method of claim 15, further comprising:
determining a location of a roadway worker along the roadway; and
controlling the vehicle when the vehicle is approaching the roadway worker.

20. The method of claim 15, wherein the vehicle comprises a plurality of cars each comprising one of the vehicle radios, the method further comprising:
establishing a communication network among the vehicle radios.

* * * * *